United States Patent
Kim et al.

(10) Patent No.: US 11,706,418 B2
(45) Date of Patent: *Jul. 18, 2023

(54) METHOD FOR PROCESSING IMAGE PROVIDING IMPROVED ARITHMETIC ENCODING, METHOD FOR DECODING AND ENCODING IMAGE USING SAME, AND APPARATUS FOR SAME

(71) Applicants: ELECTRONICS AND TELECOMMUNICATIONS RESEARCH INSTITUTE, Daejeon (KR); CHIPS&MEDIA, INC., Seoul (KR)

(72) Inventors: Dae Yeon Kim, Seoul (KR); Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR)

(73) Assignees: Electronics and Telecommunications Research Institute, Daejeon (KR); CHIPS&MEDIA, INC., Seoul (KR)

( * ) Notice: Subject to any disclaimer, the term of this patent is extended or adjusted under 35 U.S.C. 154(b) by 132 days.

This patent is subject to a terminal disclaimer.

(21) Appl. No.: 17/224,623

(22) Filed: Apr. 7, 2021

(65) Prior Publication Data

US 2021/0258582 A1    Aug. 19, 2021

Related U.S. Application Data

(63) Continuation of application No. 16/494,027, filed as application No. PCT/KR2018/002415 on Feb. 27, 2018, now Pat. No. 11,109,032.

(30) Foreign Application Priority Data

Mar. 31, 2017    (KR) .................. 10-2017-0042264

(51) Int. Cl.
*H04N 19/13*    (2014.01)
*H04N 19/103*    (2014.01)
(Continued)

(52) U.S. Cl.
CPC ........... *H04N 19/13* (2014.11); *H04N 19/103* (2014.11); *H04N 19/124* (2014.11); *H04N 19/176* (2014.11); *H04N 19/70* (2014.11)

(58) Field of Classification Search
CPC .... H04N 19/13; H04N 19/103; H04N 19/124; H04N 19/176; H04N 19/70;
(Continued)

(56) References Cited

U.S. PATENT DOCUMENTS

| | | | |
|---|---|---|---|
| 9,264,706 B2 | 2/2016 | Karczewicz et al. | |
| 9,379,736 B2 | 6/2016 | Sole Rojals et al. | |
| 2012/0328026 A1* | 12/2012 | Sole Rojals | H04N 19/463 375/240.18 |

FOREIGN PATENT DOCUMENTS

| | | |
|---|---|---|
| CN | 104980749 A | 10/2015 |
| KR | 10-2010-0058618 A | 6/2010 |

(Continued)

OTHER PUBLICATIONS

International Search Report dated Jun. 7, 2018 in corresponding International Application No. PCT/KR2018/002415 (4 pages in English, 4 pages in Korean).

*Primary Examiner* — Nam D Pham
(74) *Attorney, Agent, or Firm* — NSIP Law

(57) ABSTRACT

According to an embodiment of the present invention, there is provided an image decoding method including: obtaining an arithmetic-coded symbol stream from an image stream; identifying a symbol segment from the symbol stream according to symbol segment information signaled from an encoding apparatus; selecting an arithmetic decoding pro- (Continued)

cess corresponding to the symbol segment; and collectively processing one or more symbols among multiple symbols included in the symbol segment, in association with the selected arithmetic decoding process.

9 Claims, 27 Drawing Sheets

(51) Int. Cl.
    *H04N 19/124*     (2014.01)
    *H04N 19/176*     (2014.01)
    *H04N 19/70*     (2014.01)

(58) Field of Classification Search
    CPC .. H04N 19/436; H04N 19/157; H04N 19/184; H04N 19/147
    See application file for complete search history.

(56) References Cited

FOREIGN PATENT DOCUMENTS

| | | |
|---|---|---|
| KR | 10-2014-0017016 A | 2/2014 |
| KR | 10-2015-0003299 A | 1/2015 |
| KR | 10-2015-0028688 A | 3/2015 |
| KR | 10-2016-0147021 A | 12/2016 |
| WO | WO 2014/002407 A1 | 1/2014 |
| WO | WO 2014/107065 A1 | 7/2014 |
| WO | WO 2015/184069 A1 | 12/2015 |
| WO | WO 2016/076677 A1 | 5/2016 |

\* cited by examiner

Arithmetic coding unit stream corresponding to second picture

| header (no_probability_update_flag = 1) | First symbol (bin) segment — In arithmetic decoding, probability update for all bins is not performed | header (no_probability_update_flag = 0) | Second symbol (bin) segment — In arithmetic decoding, probability update for any bins is possible | header (no_probability_update_flag = 1) | Third symbol (bin) segment — In arithmetic decoding, probability update for all bins is not performed |

METHOD FOR PROCESSING IMAGE PROVIDING IMPROVED ARITHMETIC ENCODING, METHOD FOR DECODING AND ENCODING IMAGE USING SAME, AND APPARATUS FOR SAME

CROSS REFERENCE TO RELATED APPLICATIONS

This application is a Continuation of U.S. patent application Ser. No. 16/494,027 filed on Sep. 13, 2019 which is a U.S. National Stage Application of International Application No. PCT/KR2018/002415, filed on Feb. 27, 2018, which claims the benefit under 35 USC 119(a) and 365(b) of Korean Patent Application No. 10-2017-0042264, filed on Mar. 31, 2017 in the Korean Intellectual Property Office, the entire disclosure of which is incorporated herein by reference for all purposes.

TECHNICAL FIELD

The present invention relates to an image processing method, and an image decoding method, an image encoding method, an image decoding apparatus, and an image encoding apparatus using the image processing method. More particularly, the present invention relates to an image processing method providing improved arithmetic coding, and an image decoding method, an image encoding method, an image decoding apparatus, and an image encoding apparatus using the image processing method.

BACKGROUND ART

A digital video technology applies to a wide range of digital video devices including a digital television, a digital direct broadcasting system, a wireless broadcasting system, a personal digital assistant (PDA), a laptop or desktop computer, a digital camera, a digital recording device, a video gaming device, a video game console, a cellular or satellite radio telephone, and the like, in an integrated manner. The digital video devices implement a video compression technology such as MPEG-2, MPEG-4, or ITU-T H.264/MPEG-4, Part 10, advanced video coding (AVC), H.265/High Efficiency Video Coding (HEVC), and thus more efficiently transmit and receive digital video information. The video compression technology performs spatial prediction and temporal prediction to remove or reduce the redundancy inherent in a video sequence.

As such an image compression technology, there are various techniques: an inter prediction technique of predicting a value of a pixel included in a current picture from a previous or subsequent picture of the current picture; an intra prediction technique of predicting a value of a pixel included in a current picture by using pixel information within the current picture; an entropy encoding technique of assigning a short code to a value with the high frequency of appearance and of assigning a long code to a value with the low frequency of appearance, and the like. Image data is effectively compressed using this image compression technology, and transmitted or stored.

Among these, context-based adaptive binary arithmetic coding (CABAC) is one type of entropy coding technique, which is currently supported in several coding standards such as ITU-T H.264/MPEG4, AVC, and HEVC standards. The CABAC may include a process involving several states including binarization, context model selection, and binary arithmetic coding. In the binarization, any non-binary symbol is mapped to a binary sequence (also called a bin string). In the context modeling, a model probability distribution is assigned to an element (for example, a symbol) to be coded. Afterward, in the subsequent binary arithmetic coding stage, in order to generate a sequence of bits forming a coded representation of an element to be coded according to the assigned model probability distribution, the assigned probability distribution is used in performing coding. That is, in the CABAC process, the probability of an element in a given context is known, so that an element defining a video stream is compressed without loss.

Particularly, such CABAC arithmetic coding is a binary arithmetic coding method that is widely used in H.264/AVC and HEVC. In CABAC arithmetic coding, parsing dependency between bins, which are adjacent binary symbols within a bin string, needs to be considered, so it is impossible that multiple bins are concurrently parsed and are processed as a batch. Implementation takes place in a manner that processes each bin, and thus the throughput performance is measured to be considerably low.

DISCLOSURE

Technical Problem

Accordingly, the present invention has been made keeping in mind the above problems occurring in the related art, and the present invention is intended to propose an image processing method, and an image decoding method, an image encoding method, an image decoding apparatus, and an image encoding apparatus using the image processing method, wherein an arithmetic coding processing method is improved and thus in image decoding and encoding, multiple arithmetic-coded symbols are parsed and processed concurrently or collectively, whereby throughput performance of arithmetic coding may be greatly enhanced.

Technical Solution

In order to achieve the above object, according to an embodiment of the present invention, there is provided an image decoding method including: obtaining an arithmetic-coded symbol stream from an image stream; identifying a symbol segment from the symbol stream according to symbol segment information signaled from an encoding apparatus; selecting an arithmetic decoding process corresponding to the symbol segment; and collectively processing one or more symbols among multiple symbols included in the symbol segment, in association with the selected arithmetic decoding process.

Also, in order to achieve the above object, according to an embodiment of the present invention, there is provided an image encoding method including: processing arithmetic coding on quantized image information to generate a symbol stream, wherein the processing of the arithmetic coding includes: determining a symbol segment from the symbol stream; selecting an arithmetic coding process corresponding to the symbol segment; and collectively processing one or more symbols among multiple symbols included in the symbol segment, in association with the selected arithmetic coding process.

In the meantime, the methods according to the embodiments of the present invention for solving the above problem may be implemented as a computer-executable program and a computer-readable non-volatile recording medium on which the program is stored.

Advantageous Effects

According to the embodiments of the present invention, an image processing method, and an image decoding method, an image encoding method, an image decoding apparatus, and an image encoding apparatus using the image processing method are provided, wherein in arithmetic coding including binary arithmetic coding, multiple arithmetic-coded symbols are parsed according to a predetermined segment unit and an arithmetic decoding process for batch processing or concurrent processing corresponding to the multiple symbols is selectively performed, whereby throughput performance of arithmetic coding may be greatly enhanced.

DESCRIPTION OF DRAWINGS

FIGS. 2 to 5 are diagrams illustrating a first example of a method of partitioning an image on a per-block basis for processing.

FIG. 9 is a diagram illustrating a second example of a method of partitioning an image on a per-block basis for processing.

FIGS. 19 to 21 are exemplary diagrams illustrating a stream that represents a structure of a symbol segment, and a processing process and signaling for each symbol segment according to an embodiment of the present invention.

MODE FOR INVENTION

Hereinafter, embodiments of the present invention will be described in detail with reference to the accompanying drawings. In describing the embodiments of the present invention, if it is decided that the detailed description of known function or configuration related to the invention makes the subject matter of the invention unclear, the detailed description is omitted.

It will be understood that when an element is referred to as being "coupled" or "connected" to another element, it can be directly coupled or connected to the element or intervening elements may be present therebetween. In addition, the description that a particular constituent is "included" in the present invention does not mean that a constituent other than the particular constituent is excluded but that additional constituents can be included in the scope of the embodiment or the technical idea of the present invention.

Terms "first", "second", etc. can be used to describe various elements, but the elements are not to be construed as being limited to the terms. The terms are only used to differentiate one element from other elements. For example, the "first" element may be named the "second" element without departing from the scope of the present invention, and similarly the "second" element may also be named the "first" element.

Also, the constituents in the embodiment of the present invention are independently described to represent different distinctive functions, which does not mean that each constituent is constituted as separated hardware or a single software constituent unit. In other words, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constituents for implementing the essence of the present invention except the constituents used in improving performance. The structure including only the indispensable constituents except the selective constituents used in improving only performance is also included in the scope of the present invention.

Figure 1:
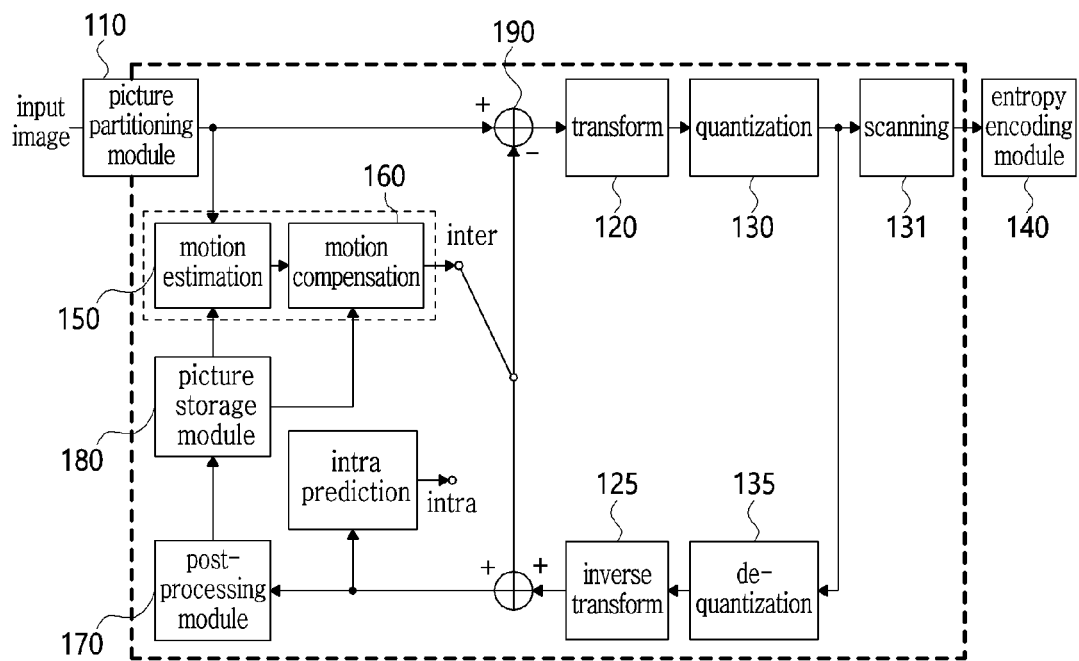
FIG. 1 is a block diagram illustrating a configuration of an image encoding apparatus according to an embodiment of the present invention.

FIG. 1 is a block diagram illustrating a configuration of an image encoding apparatus according to an embodiment of the present invention. The image encoding apparatus 10 includes a picture partitioning module 110, a transform module 120, a quantization module 130, a scanning module 131, an entropy encoding module 140, an intra prediction module 150, an inter prediction module 160, a dequantization module 135, an inverse transform module 125, a post-processing module 170, a picture storage module 180, a subtractor 190, and an adder 195.

Referring to FIG. 1, the picture partitioning module 110 analyzes an input video signal, partitions a picture into coding units to determine a prediction mode, and determines a size of a prediction unit for each of the coding units.

Also, the picture partitioning module 110 transmits the prediction unit to be encoded to the intra prediction module 150 or to the inter prediction module 160 according to the prediction mode (or a prediction method). Also, the picture partitioning module 110 transmits the prediction unit to be encoded to the subtractor 190.

Herein, a picture of an image may be composed of multiple slices, and the slice may be partitioned into multiple coding tree units (CTUs), each being the basic unit of partitioning on the picture.

The coding tree unit may be partitioned into at least one or at least two coding units (CUs), each being the basic unit of inter prediction or intra prediction.

The coding unit (CU) may be partitioned into one or more prediction units (PUs), each being the basic unit of prediction.

In this case, the encoding apparatus 10 determines any one of inter prediction and intra prediction as the prediction method for each of the partitioned coding units (CUs), but may generate different prediction blocks for the respective prediction units (PUs).

In the meantime, the coding unit (CU) may be partitioned into at least one or at least two transform units (TUs), each being the basic unit of transform on a residual block.

In this case, the picture partitioning module 110 may transmit image data to the subtractor 190 on a per-block basis (for example, the prediction unit (PU) or the transform unit (TU)), wherein the block results from the partitioning.

Figure 2:
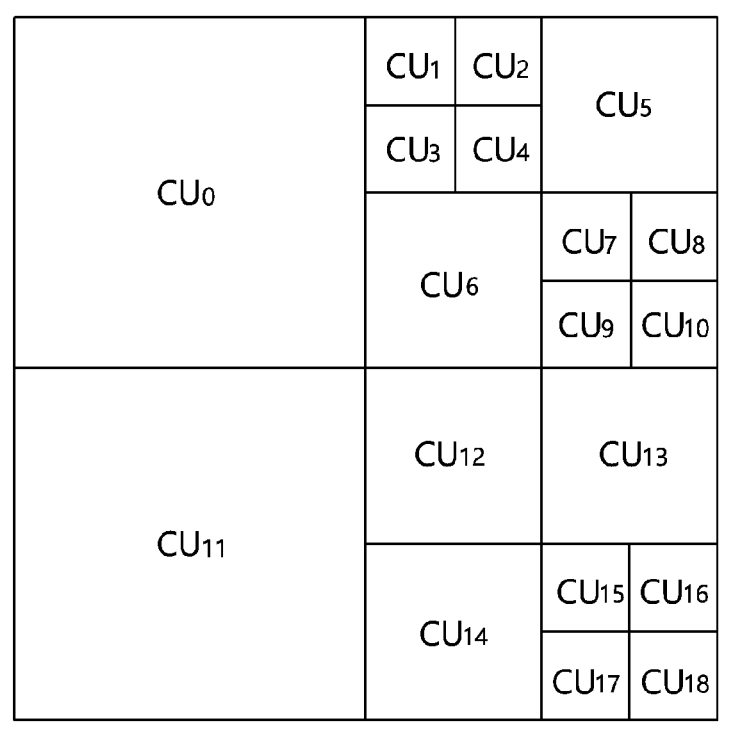

Referring to FIG. 2, a coding tree unit (CTU) in a maximum 256×256 pixel size may be partitioned with a quad tree structure into four coding units (CUs), each in a square shape.

Each of the four coding units (CUs) in a square shape may be partitioned through a quad tree structure. The depth of the coding unit (CU) partitioned through a quad tree structure as described above may have an integer value of any of 0 to 3.

The coding unit (CU) may be partitioned into at least one or at least two prediction units (PUs) according to the prediction mode.

Figure 3A:
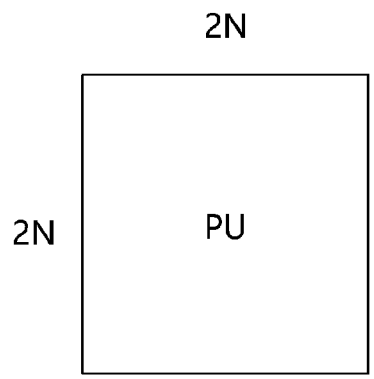
Figure 3B:
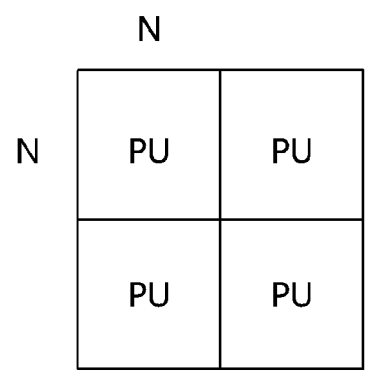

In the case of an intra prediction mode, when the coding unit (CU) is in a 2N×2N size, the prediction unit (PU) is in a size of 2N×2N shown in FIG. 3A or in a size of N×N shown in FIG. 3B.

Figure 4A:
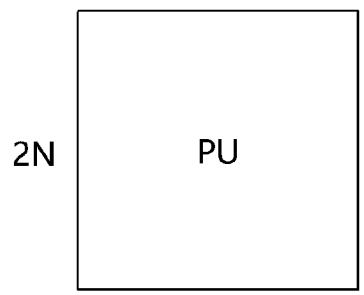
Figure 4B:
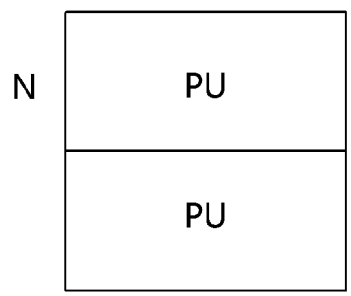
Figure 4C:
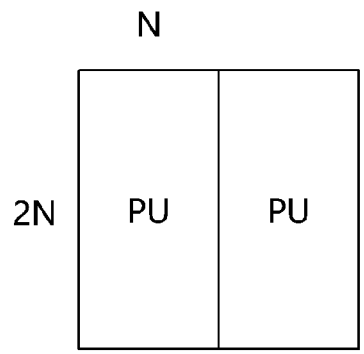
Figure 4D:
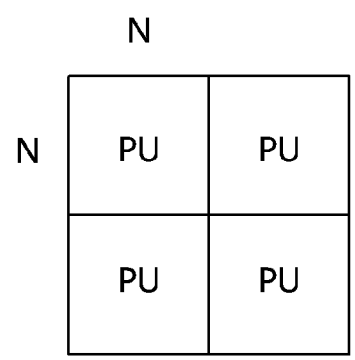
Figure 4E:
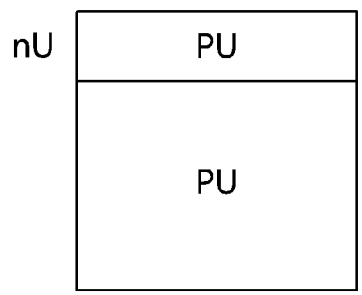
Figure 4F:
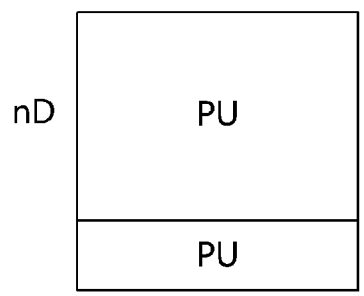
Figure 4G:
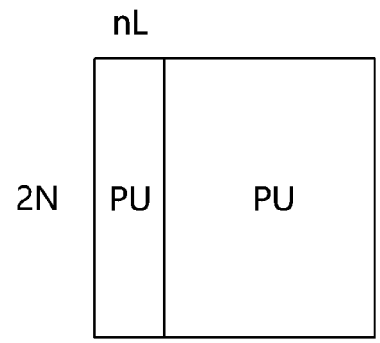
Figure 4H:
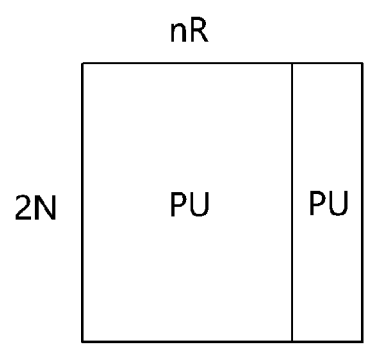

In the meantime, in the case of an inter prediction mode, when the coding unit (CU) is in a 2N×2N size, the prediction unit (PU) is in a size of any one selected among 2N×2N shown in FIG. 4A, 2N×N shown in FIG. 4B, N×2N shown in FIG. 4C, N×N shown in FIG. 4D, 2N×nU shown in FIG. 4E, 2N×nD shown in FIG. 4F, nL×2N shown in FIG. 4G, and nR×2N shown in FIG. 4H.

Figure 5:
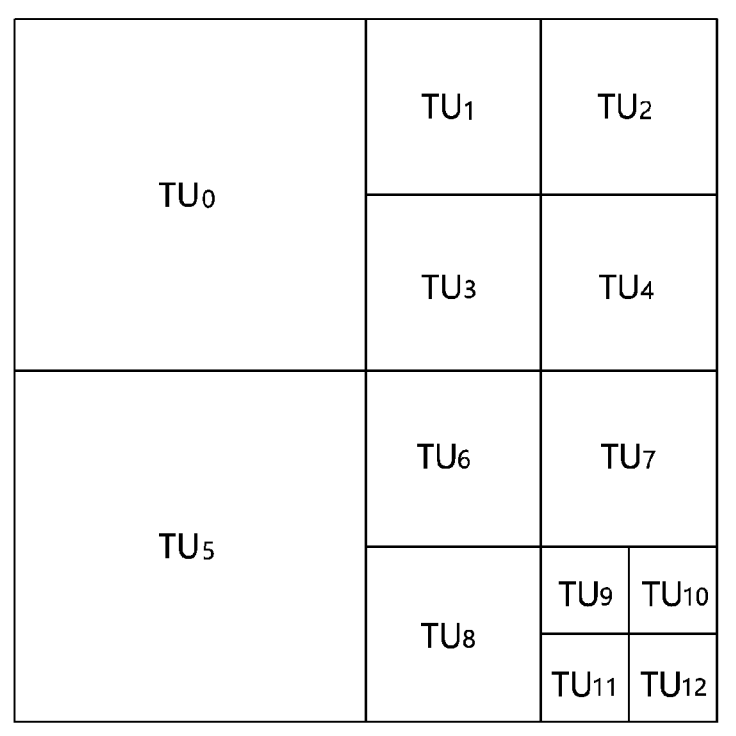

Referring to FIG. 5, the coding unit (CU) may be partitioned with a quad tree structure into four transform units (TUs), each in a square shape.

Each of the four transform units (TUs) in a square shape may be partitioned through a quad tree structure. The depth of the transform unit (TU) partitioned through a quad tree structure as described above may have an integer value of any of 0 to 3.

Here, when the coding unit (CU) is in the inter prediction mode, the prediction unit (PU) and the transform unit (TU) obtained by partitioning the coding unit (CU) has partitioning structures independent of each other.

When the coding unit (CU) is in the intra prediction mode, the transform unit (TU) obtained by partitioning the coding unit (CU) is not larger than the prediction unit (PU) in size.

Further, the transform unit (TU) resulting from the partitioning may be in a maximum 64×64 pixel size.

The transform module 120 transforms a residual block, which is a residual signal between the original block of the input prediction unit (PU) and the prediction block generated by the intra prediction module 150 or the inter prediction module 160. The transform may be performed using the transform unit (TU) as the basic unit.

In the transform process, different transform matrixes may be determined according to the prediction mode (intra or inter), and the residual signal of intra prediction has a direction according to the intra prediction mode, so that the transform matrixes may be determined adaptively according to the intra prediction mode.

A unit of transform may be transformed by two (horizontal and vertical) 1D transform matrixes. For example, in the case of inter prediction, a predetermined one transform matrix may be determined.

In the meantime, in the case of intra prediction, when the intra prediction mode is horizontal, there is a high probability that the residual block has a direction in the vertical direction, so that a DCT-based integer matrix is applied in the vertical direction and a DST-based or KLT-based integer matrix is applied in the horizontal direction. When the intra prediction mode is vertical, the DST-based or KLT-based integer matrix is applied in the vertical direction and the DCT-based integer matrix is applied in the horizontal direction.

Further, in the case of a DC mode, the DCT-based integer matrixes may be applied in the both directions.

Furthermore, in the case of intra prediction, the transform matrix may be determined adaptively on the basis of the size of the transform unit (TU).

The quantization module 130 determines a quantization step size for quantizing the coefficients of the residual block transformed by the transform matrix, and the quantization step size may be determined for each quantization unit in a predetermined size or larger.

The quantization unit may be in an 8×8 or 16×16 size, and the quantization module 130 quantizes the coefficients of the transform block by using the quantization step size and a quantization matrix determined according to the prediction mode.

Further, the quantization module 130 may use the quantization step size of the quantization unit adjacent to the current quantization unit as a quantization step size predictor of the current quantization unit.

The quantization module 130 may search the left quantization unit, the upper quantization unit, and the upper left quantization unit of the current quantization unit, in that order, and may generate the quantization step size predictor of the current quantization unit by using one or two valid quantization step sizes.

For example, the quantization module 130 may determine the first valid quantization step size found in that order as the quantization step size predictor, or may determine an average value of two valid quantization step sizes found in that order as the quantization step size predictor. Alternatively, when only one quantization step size is valid, this is determined as the quantization step size predictor.

When the quantization step size predictor is determined, the quantization module 130 transmits a difference value between the quantization step size of the current quantization unit and the quantization step size predictor to the entropy encoding module 140.

In the meantime, there are no left coding unit, upper coding unit, and upper left coding unit of the current coding unit. Alternatively, there may be a preceding coding unit considering the coding order within the largest coding unit.

Therefore, within the quantization units adjacent to the current coding unit and within the largest coding unit, the quantization step size of the immediately preceding quantization unit considering the coding order may be a candidate.

In this case, the priority may be set in this order, 1) the left quantization unit of the current coding unit, 2) the upper quantization unit of the current coding unit, 3) the upper left quantization unit of the current coding unit, and 4) the immediately preceding quantization unit considering the coding order. The order may be changed, and the upper left quantization unit may be omitted.

In the meantime, the quantized transform block as described above is transmitted to the dequantization module 135 and the scanning module 131.

The scanning module 131 scans the coefficients of the quantized transform block for transform into 1D quantization coefficients. In this case, the distribution of the coefficients of the transform block after quantization may be dependent on the intra prediction mode, so that the scanning method may be determined according to the intra prediction mode.

Further, the different coefficient scanning methods may be determined depending on the size of the unit of transform, and the scan patterns may vary according to an angular intra prediction mode. In this case, regarding the scanning order, the quantization coefficients may be scanned in the reverse direction.

When the quantized coefficients are partitioned into multiple sub-sets, the same scan pattern is applied to the quantization coefficients within each sub-set. As a scan pattern between the sub-sets, zigzag scanning or diagonal scanning may be applied.

In the meantime, preferably, the scan pattern is that scanning is performed starting from the main sub-set including DC to the remaining sub-sets in the forward direction, but the reverse direction is also possible.

Further, the scan pattern between the sub-sets may be set in the same manner as the scan pattern of the quantized coefficients within the sub-set, or the scan pattern between the sub-sets may be determined according to the intra prediction mode.

In the meantime, the encoding apparatus 10 cause information indicating the position of the last non-zero quantization coefficient within the transform unit (PU) and the position of the last non-zero quantization coefficient within each sub-set to be included in a bitstream for transmission to the decoding apparatus 20.

The dequantization module 135 dequantizes the quantization coefficient quantized as described above. The inverse transform module 125 performs inverse transform on a per-transform unit (TU) basis to reconstruct the dequantized transform coefficient into the residual block in a spatial domain.

The adder 195 may generate a reconstructed block by adding the residual block reconstructed by the inverse transform module 125 and the prediction block received from the intra prediction module 150 or inter prediction module 160.

Further, the post-processing module 170 may perform a deblocking filter process for removing block effect occurring in the reconstructed picture, a sample adaptive offset (SAO) application process for compensating for a difference value from the original image on a per-pixel basis, and an adaptive loop filtering (ALF) process for compensating for a difference value from the original image by using the coding unit.

The deblocking filtering process may be applied to a boundary of the prediction unit (PU) or the transform unit (TU) in a predetermined size or larger.

For example, the deblocking filtering process may include a step of determining a boundary to be filtered, a step of determining a boundary filtering strength to be applied to the boundary, a step of determining whether or not the deblocking filter is applied, and a step of, when it is determined that the deblocking filter is applied, selecting a filter to be applied to the boundary.

In the meantime, whether or not the deblocking filter is applied may be determined depending on i) whether or not the boundary filtering strength is greater than 0 and on ii) whether or not a value, which indicates the degree of change in the values of pixels at the boundary portions of two blocks (block P and block Q) adjacent to the filter to be filtered, is smaller than a first reference value determined by the quantization parameter.

Preferably, at least two filters are provided. When the absolute value of the difference value between two pixels positioned at the block boundary is equal to or larger than a second reference value, a filter that performs relatively weak filtering is selected.

The second reference value is determined depending on the quantization parameter and the boundary filtering strength.

Further, the sample adaptive offset (SAO) application process is intended to reduce the difference value (distortion) between the pixel within the image to which the deblocking filter is applied and the original pixel. Whether or not the sample adaptive offset (SAO) application process is performed may be determined on a per-picture or slice basis.

The picture or slice may be partitioned into multiple offset regions, and an offset type may be determined for each offset region. Examples of the offset type may include a predetermined number (for example, four) of edge offset types and two band offset types.

For example, when the offset type is the edge offset type, the edge type to which each pixel belongs is determined and the corresponding offset is applied. The edge type may be determined on the basis of the distribution of values of two pixels adjacent to the current pixel.

In the adaptive loop filtering (ALF) process, filtering may be performed on the basis of a value obtained by comparing a reconstructed image, which has been subjected to the deblocking filtering process or the adaptive offset application process, and the original image.

The picture storage module 180 receives the post-processed image data from the post-processing module 170 and reconstructs the image on a per-picture basis for storage. The picture may be a frame-based image or a field-based image.

The inter prediction module 160 may perform motion estimation by using at least one reference picture stored in the picture storage module 180, and may determine a reference picture index indicating a reference picture, and a motion vector.

In this case, according to the determined reference picture index and the determined motion vector, the prediction block corresponding to the prediction unit to be encoded may be extracted from the reference picture used for motion estimation among multiple reference pictures stored in the picture storage module 180.

The intra prediction module 150 may perform intra prediction encoding by using a value of the reconstructed pixel within the picture including the current prediction unit.

The intra prediction module 150 receives the current prediction unit to be predictively encoded and selects one intra prediction mode among a preset number of intra prediction modes according to the size of the current block so as to perform intra prediction.

The intra prediction module 150 adaptively filters the reference pixel to generate an intra prediction block. When the reference pixel is unavailable, available reference pixels are used to generate reference pixels.

Further, the entropy encoding module 140 may perform entropy encoding on the quantization coefficient quantized by the quantization module 130, intra prediction information received from the intra prediction module 150, motion information received from the inter prediction module 160, and the like.

Herein, the entropy encoding module 140 according to the embodiment of the present invention may perform an arithmetic coding process according to the embodiment of the present invention. Accordingly, the entropy encoding module 140 parses multiple arithmetic-coded symbols according to a predetermined segment unit, and selectively performs batch processing or concurrent processing corresponding to the multiple symbols, whereby throughput performance of arithmetic coding may be greatly enhanced. This will be described in detail later.

Figure 6:
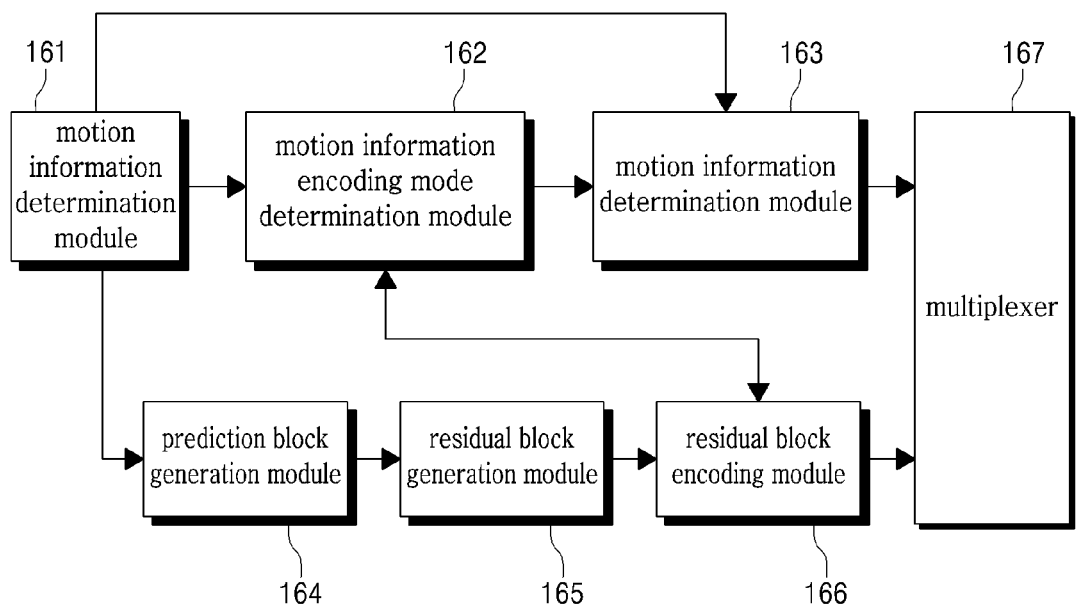
FIG. 6 is a block diagram illustrating an example of a method of performing inter prediction by an image encoding apparatus.

FIG. 6 is a block diagram illustrating an example of a configuration for performing inter prediction by the encoding apparatus 10. An inter prediction encoder shown in the figure may include a motion information determination module 161, a motion information encoding mode determination module 162, a motion information encoding module 163, a prediction block generation module 164, a residual block generation module 165, a residual block encoding module 166, and a multiplexer 167.

Referring to FIG. 6, the motion information determination module 161 determines motion information of the current block, wherein the motion information includes a reference picture index and a motion vector, and the reference picture index may indicate any one of pictures previously encoded and reconstructed.

When the current block is subjected to inter prediction encoding with unidirection, the reference picture index indicating one of the reference pictures in list 0 (L0) is included. When the current block is subjected to prediction encoding with bidirection, the reference picture index indicating one of the reference pictures in list 0 (L0) and the reference picture index indicating one of the reference pictures in list 1 (L1) are included.

Further, when the current block is subjected to prediction encoding with bidirection, an index is included, which indicating one or two pictures among the reference pictures in a combined list (LC) generated by combining list 0 and list 1.

The motion vector indicates the position of the prediction block within the picture indicated by each reference picture index, and the motion vector may be based on a pixel (based on an integer) or based on a subpixel.

For example, the motion vector may have ½, ¼, ⅛, or ¹⁄₁₆-pixel resolution. When the motion vector is not based on an integer, the prediction block is generated from integer-based pixels.

The motion information encoding mode determination module 162 may determine the encoding mode for the motion information of the current block to be one mode among a skip mode, a merge mode, and an AMVP mode.

The skip mode is applied when there is a skip candidate having motion information which is the same as the motion information of the current block and the residual signal is 0. The skip mode is applied when the current block which is the prediction unit (PU) and the coding unit (CU) are the same in size.

The merge mode is applied when there is a merge candidate having motion information which is the same as the motion information of the current block. The merge mode is applied when the current block and the coding unit (CU) differ in size, or when the current block and the coding unit (CU) are the same in size and the residual signal is present. In the meantime, the merge candidate and the skip candidate may be the same.

The AMVP mode is applied when the skip mode and the merge mode are not applied. An AMVP candidate having the motion vector that is most similar to the motion vector of the current block may be selected as an AMVP predictor.

The motion information encoding module 163 may encode the motion information according to the method determined by the motion information encoding mode determination module 162.

For example, the motion information encoding module 163 performs a merge motion vector encoding process when the motion information encoding mode is the skip mode or the merge mode, and performs an AMVP encoding process when the motion information encoding mode is the AMVP mode.

The prediction block generation module 164 generates the prediction block by using the motion information of the current block. When the motion vector is based on an integer, the block corresponding to the position indicated by the motion vector within the picture which is indicated by the reference picture index is copied to generate the prediction block of the current block.

In the meantime, when the motion vector is not based on an integer, the prediction block generation module 164 generates the pixels of the prediction block from the integer-based pixels within the picture indicated by the reference picture index.

In this case, a prediction pixel is generated using an 8-tap interpolation filter for a luma pixel, and a prediction pixel is generated using a 4-tap interpolation filter for a chroma pixel.

The residual block generation module 165 generates a residual block by using the current block and the prediction block of the current block. When the current block is in a 2N×2N size, the current block and a 2N×2N-sized prediction block corresponding to the current block are used to generate the residual block.

In the meantime, when the current block used for prediction is in a 2N×N or N×2N size, a prediction block for each of the two 2N×N blocks constituting a 2N×2N block is obtained, and then the two 2N×N prediction blocks are used to generate a final prediction block in a 2N×2N size.

Further, the prediction block in a 2N×2N size may be used to generate a residual block in a 2N×2N size. In order to resolve the discontinuity at the boundary portions of the two prediction blocks in a 2N×N size, overlap smoothing may be applied to the pixels at the boundary portions.

The residual block encoding module 166 partitions the residual block into one or more transform units (TUs). Each of the transform units (TUs) may be subjected to transform encoding, quantization, and entropy encoding.

The residual block encoding module 166 may use an integer-based transform matrix to transform the residual block generated by the inter prediction method, and the transform matrix may be an integer-based DCT matrix.

In the meantime, the residual block encoding module 166 uses a quantization matrix to quantize the coefficients of the residual block transformed by the transform matrix, and the quantization matrix may be determined by the quantization parameter.

The quantization parameter may be determined for each coding unit (CU) in a predetermined size or larger. When the size of the current coding unit (CU) is smaller than the predetermined size, only the quantization parameter of the first coding unit (CU) considering the coding order among the coding units (CUs) within the predetermined size is encoded and the quantization parameters of the remaining coding units (CUs) are not encoded because the parameters are the same.

Further, the quantization matrix determined depending on the quantization parameter and the prediction mode may be used to quantize the coefficients of the transform block.

The quantization parameter determined for each coding unit (CU) in the predetermined size or larger may be predictively encoded using the quantization parameter of the coding unit (CU) adjacent to the current coding unit (CU).

The left coding unit (CU), and the upper coding unit (CU) of the current coding unit (CU) may be searched, in that order, and one or two valid quantization parameters may be used to generate the quantization parameter predictor of the current coding unit (CU).

For example, the first valid quantization parameter found in that order may be determined as the quantization parameter predictor. Further, the left coding unit (CU), and the immediately preceding coding unit (CU) considering the coding order may be searched, in that order, and the first valid quantization parameter may be determined as the quantization parameter predictor.

The coefficients of the quantized transform block may be scanned and then transformed into 1D quantization coefficients. The different scanning methods may be set according to the entropy encoding mode.

For example, when encoding is performed using CABAC, quantization coefficients subjected to inter prediction encoding are scanned using one predetermined method (zigzag scanning, or raster scanning in a diagonal direction). When encoding is performed using CAVLC, scanning is performed using the method different from the above method.

For example, in the case of an inter scanning method, zigzag scanning is used, and in the case of an intra scanning method, the scanning method may be determined according to the intra prediction mode. The different coefficient scanning methods may be determined according to the size of the unit of transform.

In the meantime, the scan pattern may vary according to the angular intra prediction mode, and regarding the scanning order, the quantization coefficients may be scanned in the reverse direction.

The multiplexer 167 multiplexes pieces of motion information encoded by the motion information encoding module 163 and the residual signals encoded by the residual block encoding module 166.

Pieces of the motion information may vary according to the encoding mode. For example, in the case of the skip or merge mode, only the index indicating the predictor may be included. In the case of the AMVP mode, the reference picture index of the current block, a difference motion vector, and an AMVP index may be included.

Hereinafter, an example of the operation of the intra prediction module 150 shown in FIG. 1 will be described in detail.

First, the intra prediction module 150 receives, from the picture partitioning module 110, information on the prediction mode and the size of the prediction unit (PU), and reads the reference pixel from the picture storage module 180 to determine the intra prediction mode of the prediction unit (PU).

The intra prediction module 150 checks whether or not an unavailable reference pixel is present to determine whether or not the reference pixel is generated. The reference pixels may be used to determine the intra prediction mode of the current block.

When the current block is positioned at the upper boundary of the current picture, the pixels adjacent to the upper side of the current block are not defined. When the current block is positioned at the left boundary of the current picture, the pixels adjacent to the left side of the current block are not defined. It may be determined that the pixels are unavailable pixels.

Further, even when the current block is positioned at the slice boundary and the pixels adjacent to the upper side or left side of the slice are not the previously encoded and reconstructed pixels, it is determined that the pixels are unavailable pixels.

As described above, when there are no pixels adjacent to the left side or upper side of the current block or when there are no pixels previously encoded and reconstructed, the intra prediction mode of the current block is determined using only available pixels.

In the meantime, a reference pixel at an unavailable position may be generated using the available reference pixels of the current block. For example, when the pixels of the upper block are unavailable, the upper pixels are generated using a part or all of the left pixels, and vice versa.

That is, an available reference pixel at a position closest from the reference pixel at an unavailable position in a predetermined direction may be copied to generate the reference pixel. Alternatively, when the available reference pixel is not present in the predetermined direction, the available reference pixel at the closest position in the opposite direction is copied to generate the reference pixel.

In the meantime, even when the upper or left pixels of the current block are present, it is determined that the pixels are unavailable reference pixels according to the encoding mode of the block to which the pixels belong.

For example, when the block to which the reference pixel adjacent to the upper side of the current block belongs is a block that is inter encoded and reconstructed, it is determined that the pixels are unavailable pixels.

In this case, the pixels that belong to the block in which the block adjacent to the current block is intra encoded and reconstructed may be used to generate available reference pixels, and the encoding apparatus 10 transmits information indicating that the available reference pixel is determined according to the encoding mode to the decoding apparatus 20.

The intra prediction module 150 determines the intra prediction mode of the current block by using the reference pixels, and the numbers of the intra prediction modes allowable for the current block may vary according to the size of the block.

For example, when the current block is in a size of 8×8, 16×16, and 32×32, 34 intra prediction modes are present. When the current block is in a size of 4×4, 17 intra prediction modes are present.

The 34 or 17 intra prediction modes may include at least one non-angular mode (non-directional mode) and multiple angular modes (directional modes).

The at least one non-angular mode may be the DC mode and/or a planar mode. When the DC mode and the planar mode are included as the non-angular modes, 35 intra prediction modes are present regardless of the size of the current block.

In this case, two non-angular modes (the DC mode and the planar mode) and 33 angular modes may be included.

In the case of the planar mode, the value (or a prediction value of the pixel value, hereinafter, referred to as a first reference value) of at least one pixel positioned at the bottom right of the current block and reference pixels are used to generate the prediction block of the current block.

The configuration of the image decoding apparatus according to the embodiment of the present invention may be derived from the configuration of the image encoding apparatus 10 described with reference to FIGS. 1 to 6. For example, the processes of the image encoding method as described above with reference to FIGS. 1 to 6 are performed in a reverse manner, thereby decoding the image.

Figure 7:
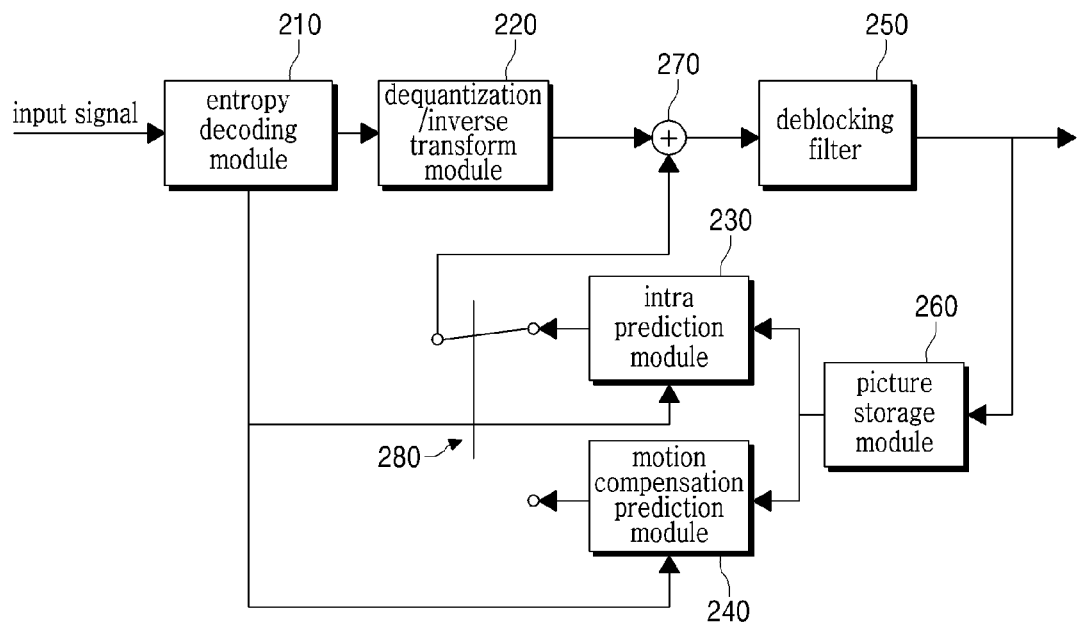
FIG. 7 is a block diagram illustrating a configuration of an image decoding apparatus according to an embodiment of the present invention.

FIG. 7 is a block diagram illustrating a configuration of an image decoding apparatus according to an embodiment of the present invention. The decoding apparatus 20 includes an entropy decoding module 210, a dequantization/inverse transform module 220, an adder 270, a deblocking filter 250, a picture storage module 260, an intra prediction module 230, a motion compensation prediction module 240, and an intra/inter conversion switch 280.

The entropy decoding module 210 receives the bitstream encoded by the image encoding apparatus 10 for decoding and separates the resulting bitstream into an intra prediction mode index, motion information, a quantization coefficient sequence, and the like, and then transmits the decoded motion information to the motion compensation prediction module 240.

Further, the entropy decoding module 210 transmits the intra prediction mode index to the intra prediction module 230 and the dequantization/inverse transform module 220, so that the dequantization coefficient sequence is transmitted to the dequantization/inverse transform module 220.

The dequantization/inverse transform module 220 transforms the quantization coefficient sequence into a 2D array of dequantization coefficients, wherein one among multiple scanning patterns may be selected for the transform. For example, the scanning pattern may be selected on the basis of the prediction mode (namely, intra prediction or inter prediction) of the current block and the intra prediction mode.

The dequantization/inverse transform module 220 applies the quantization matrix selected among multiple quantization matrixes to the 2D array of dequantization coefficients so that the quantization coefficients are reconstructed.

In the meantime, different quantization matrixes are applied depending on the size of the current block to be reconstructed. With respect to the block of the same size, the quantization matrix may be selected on the basis of at least one among the prediction mode of the current block and the intra prediction mode.

The dequantization/inverse transform module 220 inversely transforms the reconstructed quantization coefficient to reconstruct the residual block. The inverse transform process may be performed using the transform unit (TU) as the basic unit.

The adder 270 adds the residual block reconstructed by the dequantization/inverse transform module 220 and the prediction block generated by the intra prediction module 230 or by the motion compensation prediction module 240 so that the image block is reconstructed.

The deblocking filter 250 performing deblocking filter processing on the reconstructed image generated by the adder 270, thereby reducing deblocking artifacts caused by image loss in the quantization process.

The picture storage module 260 is a frame memory for storing a local decoded image on which deblocking filter processing is performed by the deblocking filter 250.

The intra prediction module 230 reconstructs the intra prediction mode of the current block on the basis of the intra prediction mode index received from the entropy decoding module 210, and generates the prediction block according to the reconstructed intra prediction mode.

The motion compensation prediction module 240 generates, on the basis of motion vector information, the prediction block for the current block from the picture stored in the picture storage module 260, and applies, when motion compensation of fraction precision is applied, the selected interpolation filter to generate the prediction block.

The intra/inter conversion switch 280 may provide, to the adder 270 on the basis of the encoding mode, the prediction block generated by any one of the intra prediction module 230 and the motion compensation prediction module 240.

Figure 8:
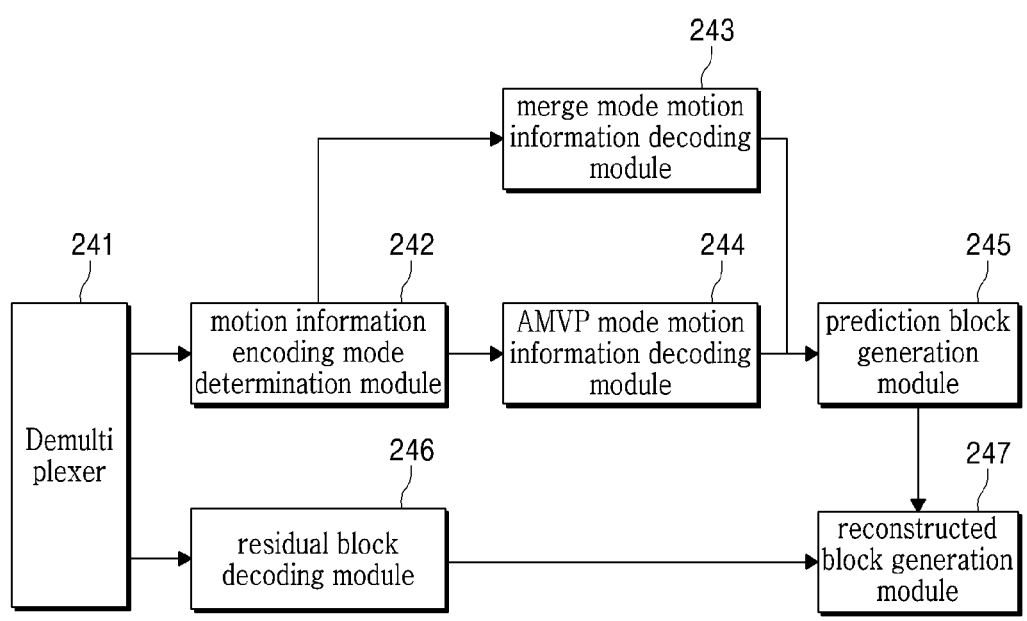
FIG. 8 is a block diagram illustrating an example of a method of performing, by an image decoding apparatus, inter prediction.

FIG. 8 is a block diagram illustrating an example of a configuration for performing inter prediction by the image decoding apparatus 20. An inter prediction decoder includes a de-multiplexer 241, a motion information encoding mode decision module 242, a merge mode motion information decoding module 243, an AMVP mode motion information decoding module 244, a prediction block generation module 245, a residual block decoding module 246, and a reconstructed block generation module 247.

Referring to FIG. 8, the de-multiplexer 241 demultiplexes the currently encoded motion information and the encoded residual signals from the received bitstream, transmits the demultiplexed motion information to the motion information encoding mode decision module 242, and transmits the demultiplexed residual signals to the residual block decoding module 246.

The motion information encoding mode decision module 242 decides the motion information encoding mode of the current block. When skip_flag of the received bitstream has a value of 1, the motion information encoding mode decision module 242 decides that the motion information encoding mode of the current block is encoded in a skip encoding mode.

The motion information encoding mode decision module 242 decides that the motion information encoding mode of the current block is encoded in the merge mode, when skip_flag of the received bitstream has a value of 0 and the motion information received from the de-multiplexer 241 contains only a merge index.

Further, the motion information encoding mode decision module 242 decides that the motion information encoding mode of the current block is encoded in the AMVP mode, when skip_flag of the received bitstream has a value of 0 and the motion information received from the de-multiplexer 241 contains the reference picture index, the difference motion vector, and the AMVP index.

The merge mode motion information decoding module 243 is activated when the motion information encoding mode decision module 242 decides that the motion information encoding mode of the current block is the skip or merge mode. The AMVP mode motion information decoding module 244 is activated when the motion information encoding mode decision module 242 decides that the motion information encoding mode of the current block is the AMVP mode.

The prediction block generation module 245 generates the prediction block of the current block by using the motion information reconstructed by the merge mode motion information decoding module 243 or the AMVP mode motion information decoding module 244.

When the motion vector is based on an integer, the block corresponding to the position indicated by the motion vector within the picture which is indicated by the reference picture index is copied to generate the prediction block of the current block.

In the meantime, when the motion vector is not based on an integer, pixels of the prediction block are generated from the integer-based pixels within the picture indicated by the reference picture index. In this case, the prediction pixel may be generated using the 8-tap interpolation filter for the luma pixel and using the 4-tap interpolation filter for the chroma pixel.

The residual block decoding module 246 entropy decodes the residual signal, and inversely scans the entropy-decoded coefficients to generate a 2D quantized coefficient block. The inverse scanning methods may vary according to the entropy decoding method.

For example, in the case of decoding based on CABAC, an inverse raster scanning method in a diagonal direction is applied as the inverse scanning method. In the case of decoding based on CAVLC, an inverse zigzag scanning method is applied as the inverse scanning method. Further, different inverse scanning methods may be determined according to the size of the prediction block.

The residual block decoding module 246 may dequantize the coefficient block generated as described above by using a dequantization matrix, and may reconstruct a quantization parameter to derive the dequantization matrix. Herein, the quantization step size may be reconstructed for each coding unit in a predetermined size or larger.

The residual block decoding module 260 inverse transforms the dequantized coefficient block to reconstruct the residual block.

The reconstructed block generation module 270 adds the prediction block generated by the prediction block generation module 250 and the residual block generated by the residual block decoding module 260 to generate the reconstructed block.

Hereinafter, an example of a process of reconstructing the current block through intra prediction will be described with reference back to FIG. 7.

First, the intra prediction mode of the current block is decoded from the received bitstream. To this end, the entropy decoding module 210 reconstructs a first intra prediction mode index of the current block by referring to one of multiple intra prediction mode tables.

The multiple intra prediction mode tables are tables shared by the encoding apparatus 10 and the decoding apparatus 20. One table may be applied which is selected according to the distribution of the intra prediction modes for the multiple blocks adjacent to the current block.

For example, when the intra prediction mode of the left block of the current block is the same as the intra prediction mode of the upper block of the current block, a first intra prediction mode table is applied to reconstruct the first intra prediction mode index of the current block. When the intra prediction mode of the left block of the current block is not the same as the intra prediction mode of the upper block of the current block, a second intra prediction mode table is applied to reconstruct the first intra prediction mode index of the current block.

As another example, in the case where the intra prediction modes of the upper block and the left block of the current block are the angular prediction modes (directional intra prediction modes), when the direction of the intra prediction mode of the upper block and the direction of the intra prediction mode of the left block are within a predetermined angle, the first intra prediction mode table is applied to reconstruct the first intra prediction mode index of the current block, and when the direction of the intra prediction mode of the upper block and the direction of the intra prediction mode of the left block are beyond the predetermined angle, the second intra prediction mode table is applied to reconstruct the first intra prediction mode index of the current block.

The entropy decoding module 210 transmits the reconstructed first intra prediction mode index of the current block to the intra prediction module 230.

The intra prediction module 230 receiving the first intra prediction mode index may determine the maximum possible mode of the current block as the intra prediction mode of the current block when the index has the minimum value (namely, a value of 0).

In the meantime, the intra prediction module 230 compares an index indicating the maximum possible mode of the current block and the first intra prediction mode index when the index has a value other than 0. As the result of the comparison, when the first intra prediction mode index is not smaller than the index indicating the maximum possible mode of the current block, the intra prediction mode corresponding to a second intra prediction mode index, which is obtained by adding 1 to the first intra prediction mode index, is determined as the intra prediction mode of the current block. Otherwise, the intra prediction mode corresponding to the first intra prediction mode index is determined as the intra prediction mode of the current block.

The intra prediction modes allowable for the current block may include at least one non-angular mode (non-directional mode) and multiple angular modes (directional modes).

One or more non-angular modes may be the DC mode and/or the planar mode. Further, any one of the DC mode and the planer mode may be adaptively included in a set of the allowable intra prediction modes.

To this end, the picture header or the slice header may include information specifying the non-angular mode included in the set of the allowable intra prediction modes.

Next, in order to generate the intra prediction block, the intra prediction module 230 reads the reference pixels from the picture storage module 260, and determines whether or not an unavailable reference pixel is present.

The determination may be performed according to whether or not the reference pixels are present which are used for generating the intra prediction block by applying the decoded intra prediction mode of the current block.

Next, when it is necessary to generate a reference pixel, the intra prediction module 230 uses previously reconstructed available reference pixels to generate reference pixels at unavailable positions.

The definition of the unavailable reference pixel and the method of generating the reference pixel may be the same as the operation in the intra prediction module 150 shown in FIG. 1, but the reference pixels used for generating the intra prediction block according to the decoded intra prediction mode of the current block may be selectively reconstructed.

Further, the intra prediction module 230 determines whether or not the filter is applied to the reference pixels for generating the prediction block. That is, whether or not filtering is applied to the reference pixels for generating the intra prediction block of the current block may be determined on the basis of the decoded intra prediction mode and the size of the current prediction block.

The problem of the blocking artifacts increases as the size of the block increases. Therefore, as the size of the block increases, the number of prediction modes for filtering the reference pixel may be increased. However, when the size of the block is larger than a predetermined size, it is regarded as a flat region, so that the reference pixel may not be filtering to reduce the complexity.

When it is determined that the filter needs to be applied to the reference pixel, the intra prediction module 230 uses the filter to filter the reference pixels.

According to the degree of difference in depth the between the reference pixels, at least two filters may be adaptively applied. It is preferable that filter coefficients of the filters are symmetrical.

Further, the two or more filters may be applied adaptively according to the size of the current block. When applying the filters, the filter with a narrow bandwidth is applied for blocks in a small size, and the filter with a wide bandwidth is applied for blocks in a large size.

In the case of the DC mode, the average value of the reference pixels is used to generate the prediction block, so that it is not necessary to apply the filter. In the case of a vertical mode in which an image has correlation in a vertical direction, it is not necessary to apply the filter to the reference pixel. In the case of a horizontal mode in which an image has correlation in a horizontal direction, it is not necessary to apply the filter to the reference pixel.

As described above, whether or not to apply filtering is correlated with the intra prediction mode of the current block, so that the reference pixel may be adaptively filtered on the basis of the intra prediction mode of the current block and the size of the prediction block.

Next, the intra prediction module 230 generates the prediction block by using the reference pixel or the filtered reference pixels according to the reconstructed intra prediction mode. The generation of the prediction block may be the same as the operation in the encoding apparatus 10, so that a detailed description thereof will be omitted.

The intra prediction module 230 determines whether or not the generated prediction block is filtered. Whether or not to perform the filtering may be determined using the information contained in the slice header or the coding unit header, or according to the intra prediction mode of the current block.

When it is determined that the generated prediction block is filtered, the intra prediction module 230 generates a new pixel by filtering the pixel at a particular position of the prediction block, which is generated using the available reference pixels adjacent to the current block.

For example, in the DC mode, among the prediction pixels, the prediction pixel in contact with the reference pixels may be filtered using the reference pixel in contact with prediction pixel.

Therefore, the prediction pixel is filtered using one or two reference pixels according to the position of the prediction pixel. The filtering of the prediction pixel in the DC mode may be applied to the prediction block in all sizes.

In the meantime, in the vertical mode, among the prediction pixels of the prediction block, the prediction pixels in contact with the left reference pixel may be changed using the reference pixels other than the upper pixel used for generating the prediction block.

Similarly, in the horizontal mode, among the generated prediction pixels, the prediction pixels in contact with the upper reference pixel may be changed using the reference pixels other than the left pixel used for generating the prediction block.

In this manner, the reconstructed prediction block of the current block and the decoded residual block of the current block may be used to reconstruct the current block.

Figure 9:
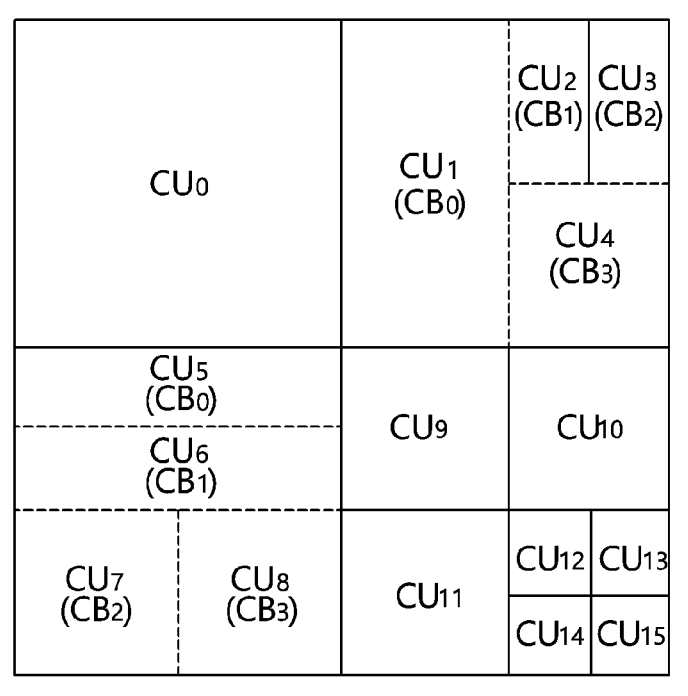

FIG. 9 is a diagram illustrating a second example of a method of partitioning an image on a per-block basis for processing.

Referring to FIG. 9, a coding tree unit (CTU) in a maximum 256×256 pixel size may be partitioned with a quad tree structure into four coding units (CUs), each in a square shape.

Herein, at least one of the coding units resulting from the partitioning through the quad tree structure may be partitioned through a binary tree structure into two smaller coding units (CUs), each in a rectangular shape.

In the meantime, at least one of the coding units resulting from the partitioning through the quad tree structure may be partitioned through a quad tree structure into four smaller coding units (CUs), each in a square shape.

Further, at least one of the smaller coding units resulting from the partitioning through the binary tree structure may be partitioned through a binary tree structure into two much smaller coding units (CUs), each in a square or rectangular shape.

In the meantime, at least one of the smaller coding units resulting from the partitioning through the quad tree structure may be partitioned through a quad tree structure or binary tree structure into much smaller coding units (CUs), each in a square or rectangular shape.

Coding blocks (CBs) resulting from the partitioning through the binary tree structure as described above are not partitioned and are used for prediction and transform. That is, the size of the prediction unit (PU) and the transform unit (TU) that belong to the coding block (CB) as shown in FIG. 9 may be the same as the size of the coding block (CB).

The coding unit resulting from the partitioning through the quad tree structure as described above may be partitioned into at least one or at least two prediction units (PUs) by using the method as described above with reference to FIGS. 3 and 4.

Further, the coding unit resulting from the partitioning through the quad tree structure as described above may be partitioned into at least one or at least two transform units (TUs) by using the method as described above with reference to FIG. 5. The transform unit (TU) resulting from the partitioning may be in a maximum 64×64 pixel size.

Further, a syntax structure used to partition an image on a per-block basis for processing may represent partitioning information using a flag. For example, whether or not the coding unit (CU) is partitioned may be represented using split_cu_flag, and the depth of the coding unit (CU) resulting from the partitioning through the binary tree may be represented using binary_depth. Further, whether or not the coding unit (CU) is partitioned through the binary tree structure may be represented by binary_split_flag.

With respect to the blocks (for example, the coding unit (CU), the prediction unit (PU), and the transform unit (TU)) resulting from the partitioning by the method as described with reference to FIG. 9, the methods as described with reference to FIGS. 1 to 8 are applied, thereby performing encoding and decoding of the image.

Hereinafter, with reference to FIGS. 10 to 15, other examples of a method of partitioning a coding unit (CU) into at least one or at least two transform units (TUs) will be described.

According to the embodiment of the present invention, a coding unit (CU) may be partitioned through a binary tree structure into transform units (TUs), each being the basic unit of transform on the residual block.

Figure 10A:
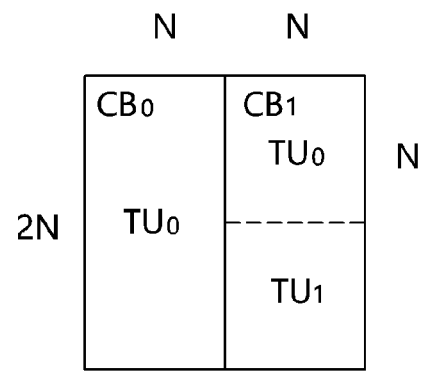
FIGS. 10A-10B show diagrams illustrating a third example of a method of partitioning an image on a per-block basis for processing.
Figure 10B:
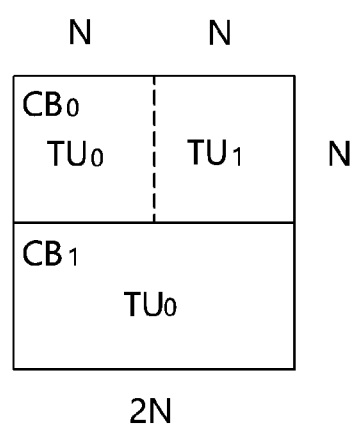

Referring to FIG. 10, at least one of rectangular coding blocks (CB0 and CB1), which result from the partitioning through the binary tree structure and are in a size of N×2N or 2N×N, may be partitioned through the binary tree structure into square transform units (TU0 and TU1) in a size of N×N.

As described above, a block-based image encoding method may perform prediction, transform, quantization, and entropy encoding steps.

In the prediction step, a prediction signal is generated by referring to a block currently subjected to encoding and an existing encoded image or neighboring image and through this, a difference signal from the current block may be calculated.

In the meantime, in the transform step, the difference signal is input and transform is performed using various transform functions. The transformed signal is separated into a DC coefficient and an AC coefficient, and thus energy compaction is achieved and encoding efficiency can be enhanced.

Further, in the quantization step, transform coefficients are input and quantization is performed, and then entropy encoding is performed on the quantized signal, thereby encoding the image.

In the meantime, the image decoding method proceeds in the reverse order of the encoding process described above, and phenomenon of image quality distortion may occur in the quantization step.

As a method for enhancing encoding efficiency and reducing the phenomenon of image quality distortion, the size or shape of the transform unit (TU) and types of transform functions to be applied may be diversified according to the distribution of the difference signals input in the transform step and the characteristics of the image.

For example, in the prediction step, when a block similar to the current block is found through a block-based motion estimation process, by using a cost measurement method such as sum of absolute difference (SAD) method, mean square error (MSE) method, or the like, the distribution of the difference signals occur in various forms depending on the characteristics of the image.

Accordingly, the size or shape of the transform unit (CU) is selectively determined on the basis of the various distributions of the difference signals and transform is performed, whereby effective encoding may be performed.

For example, when the difference signal occurs in any coding block (CBx), the coding block (CBx) is partitioned through the binary tree structure into two transform units (TUs) so that effective transform is performed. Generally, a DC value refers to an average value of an input signal. Therefore, when the difference signal is received as input in the transform process, the coding block (CBx) is partitioned into two transform units (TUs) so that the DC value is effectively represented.

Figure 11A:
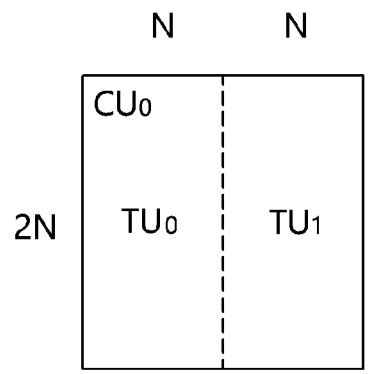
FIGS. 11A-11B show diagrams illustrating an example of a method in which a coding unit is partitioned through a binary tree structure to construct a transform unit.
Figure 11B:
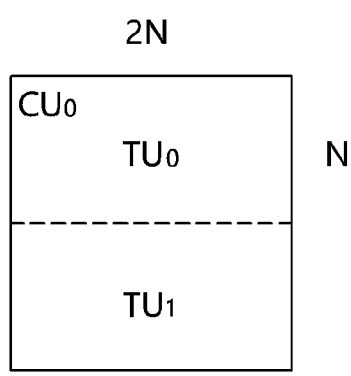

Referring to FIG. 11, a square coding unit (CU0) in a size of 2N×2N is partitioned through the binary tree structure into rectangular transform units (TU0 and TU1), each in a size of N×2N or 2N×N.

According to still another embodiment of the present invention, as described above, the step of partitioning the coding unit (CU) through the binary tree structure may be performed two or more times, resulting in multiple transform units (TUs).

Figure 12:
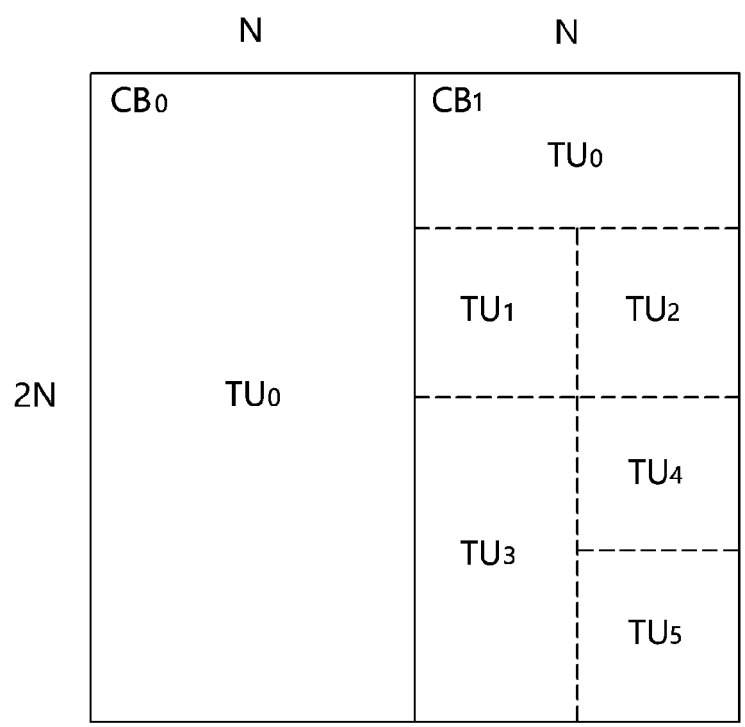
FIG. 12 is a diagram illustrating a fourth example of a method of partitioning an image on a per-block basis for processing.

Referring to FIG. 12, a rectangular coding block (CB1) in a size of N×2N is partitioned through the binary tree structure. The block in a size of N×N, which results from the partitioning, is partitioned through the binary tree structure to construct a rectangular block in a size of N×N/2 or N/2×N. Then, the block in a size of N×N/2 or N/2×N is partitioned through the binary tree structure into square transform units (TU1 and TU2; or TU4 and TU5), each in a size of N/2×N/2.

Figure 13:
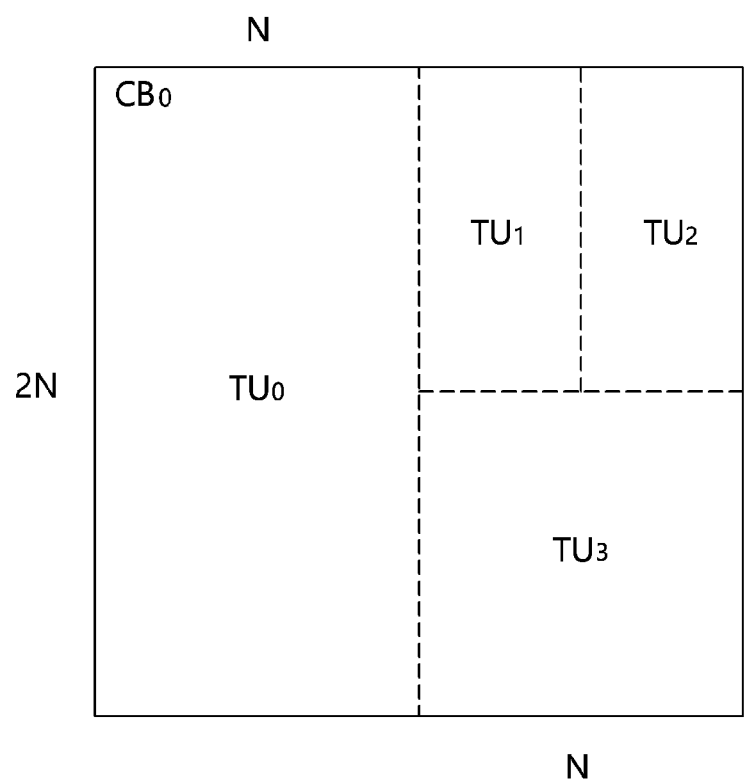
FIGS. 13 and 14 are diagrams illustrating other examples of a method of partitioning an image on a per-block basis for processing.

Referring to FIG. 13, a square coding block (CB0) in a size of 2N×2N is partitioned through the binary tree structure. The block in a size of N×2N, which results from the partitioning, is partitioned through the binary tree structure to construct a square block in a size of N×N. Then, the block in a size of N×N is partitioned through the binary tree structure into rectangular transform units (TU1 and TU2), each in a size of N/2×N.

Figure 14:
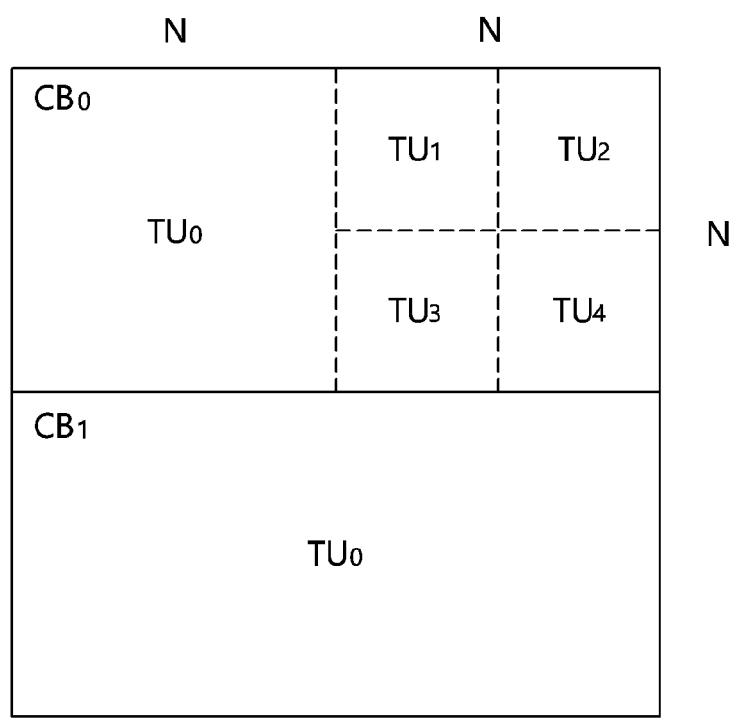

Referring to FIG. 14, a rectangular coding block (CB0) in a size of 2N×N is partitioned through the binary tree structure. The block in a size of N×N, which results from the partitioning, is partitioned through the quad tree structure into square transform units (TU1, TU2, TU3, and TU4), each in a size of N/2×N/2.

With respect to the blocks (for example, the coding unit (CU), the prediction unit (PU), and the transform unit (TU)) resulting from the partitioning by the method as described with reference to FIGS. 10 to 14, the methods as described with reference to FIGS. 1 to 8 are applied, thereby performing encoding and decoding of the image.

Hereinafter, examples of a method in which the encoding apparatus 10 according to the present invention determines a block partitioning structure will be described.

The picture partitioning module 110 of the image encoding apparatus 10 performs rate distortion optimization (RDO) according to preset order and determines the partitioning structure of the coding unit (CU), which may be partitioned as described above, the prediction unit (PU), and the transform unit (TU).

For example, in order to determine a block partitioning structure, the picture partitioning module 110 determines the optimum block partitioning structure in terms of bitrate and distortion while performing rate distortion optimization-quantization (RDO-Q).

Figure 15A:
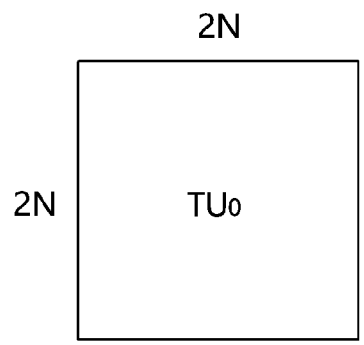
FIGS. 15A-15D and 16A-16E are diagrams illustrating examples of a method in which a partitioning structure for a transform unit is determined by performing rate distortion optimization (RDO).
Figure 15B:
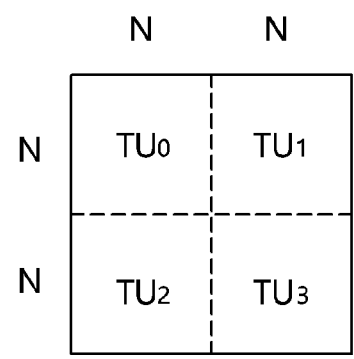
Figure 15C:
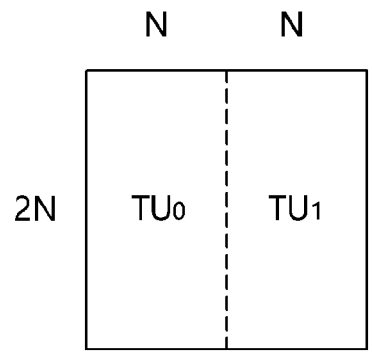
Figure 15D:
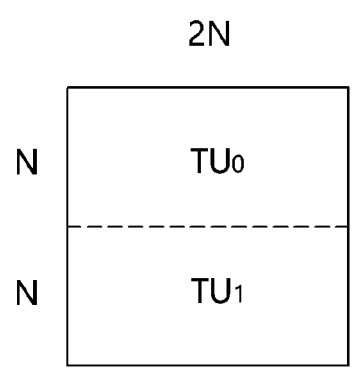

Referring to FIG. 15, when the coding unit (CU) is in a 2N×2N pixel size, RDO is performed according to the order of the partitioning structures for the transform units (PUs) in a 2N×2N pixel size shown in FIG. 15A, an N×N pixel size shown in FIG. 15B, an N×2N pixel size shown in FIG. 15C, and a 2N×N pixel size shown in FIG. 15D so that the optimum partitioning structure for the transform unit (PU) is determined.

Figure 16A:
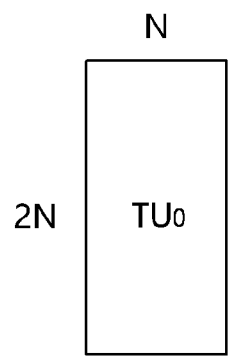
Figure 16B:
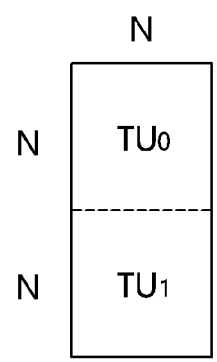
Figure 16C:
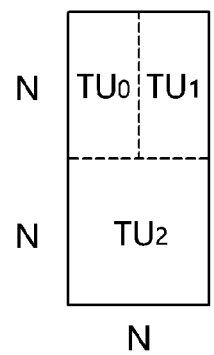
Figure 16D:
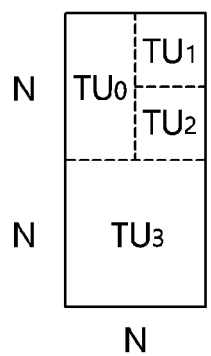
Figure 16E:
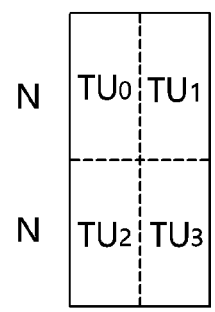

Referring to FIG. 16, when the coding unit (CU) is in a N×2N or 2N×N pixel size, RDO is performed according to the order of the partitioning structures for the transform units (PUs) in an N×2N (or 2N×N) pixel size shown in FIG. 16A, an N×N pixel size shown in FIG. 16B, an N/2×N (or N×N/2) pixel size and an N×N pixel size shown in FIG. 16C, an N/2×N/2 pixel size, an N/2×N pixel size, and an N×N pixel size shown in FIG. 16D, and an N/2×N pixel size shown in FIG. 16E so that the optimum partitioning structure for the transform units (PU) is determined.

Although the block partitioning method of the present invention has been exemplified above by describing that the block partitioning structure is determined by performing rate distortion optimization (RDO), the picture partitioning module 110 determines the block partitioning structure using sum of absolute difference (SAD) or mean square error (MSE), whereby the complexity may be reduced and proper efficiency may be maintained.

Hereinafter, an image processing method providing improved arithmetic coding and the corresponding decoding method according to an embodiment of the present invention will be described in detail.

As described above, in currently used arithmetic coding, parsing dependency is present between bins, which are adjacent binary symbols. Therefore, it is impossible that multiple bins are parsed and processed as a batch or concurrently, which is regarded as a factor that lowers the throughput performance.

Accordingly, the entropy encoding module 140 of the encoding apparatus 10 and the entropy decoding module 210 of the decoding apparatus 20 according to the embodiments of the present invention parse multiple arithmetic-coded symbols according to a predetermined segment unit and selectively perform batch processing or concurrent processing corresponding to the multiple symbols, whereby the image processing method capable of greatly enhancing the throughput performance of arithmetic coding may be provided.

Figure 17:
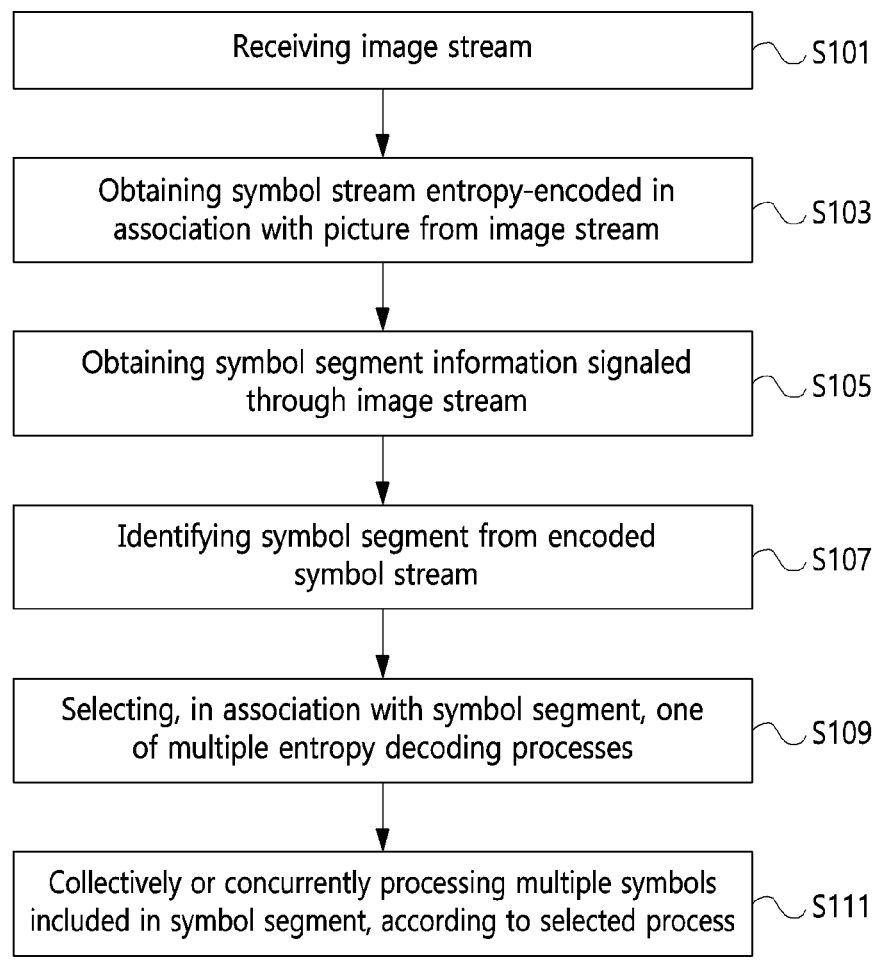
FIGS. 17 and 18 are flowcharts illustrating an operation of the decoding apparatus performing arithmetic coding according to an embodiment of the present invention.
Figure 18:
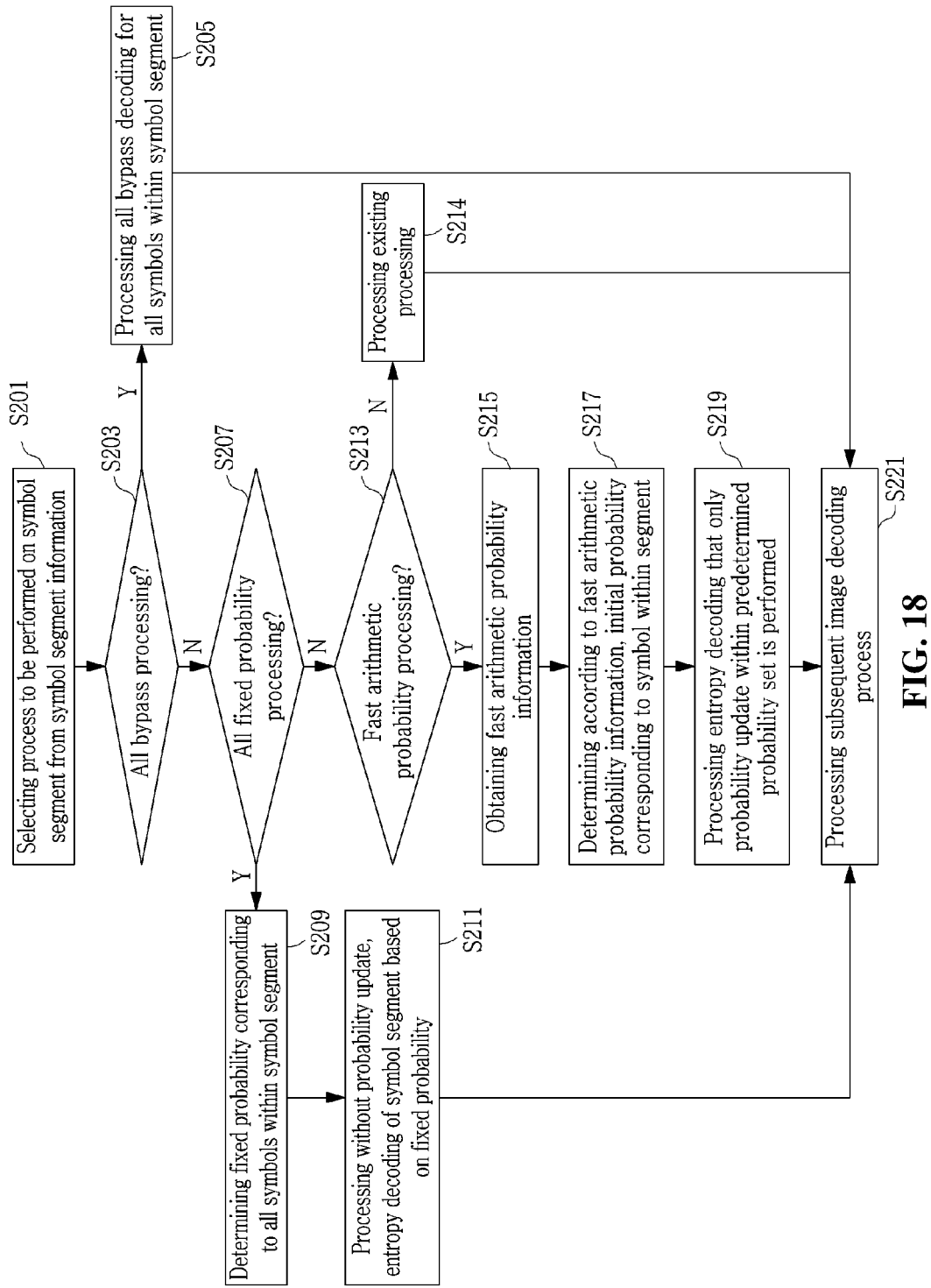
Figure 19:
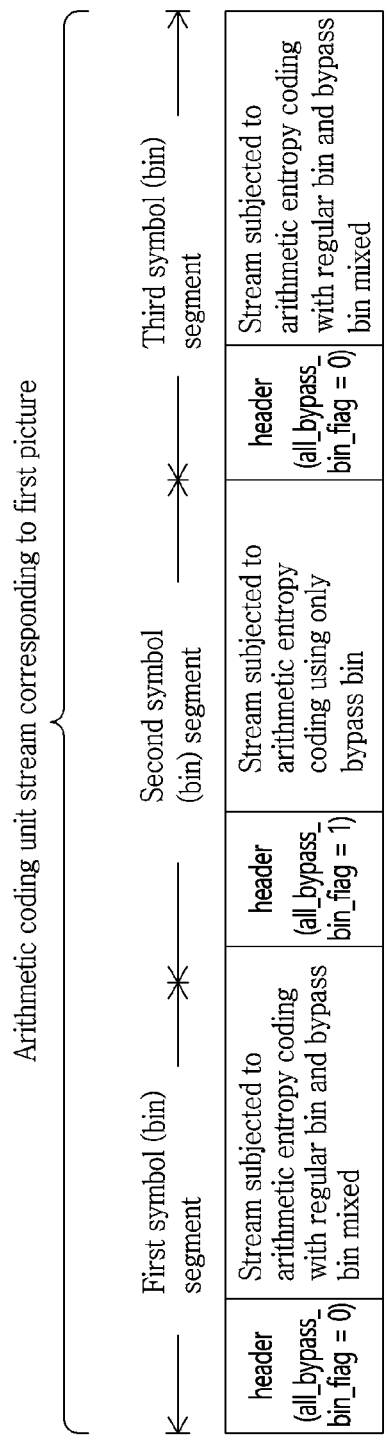
Figure 21:
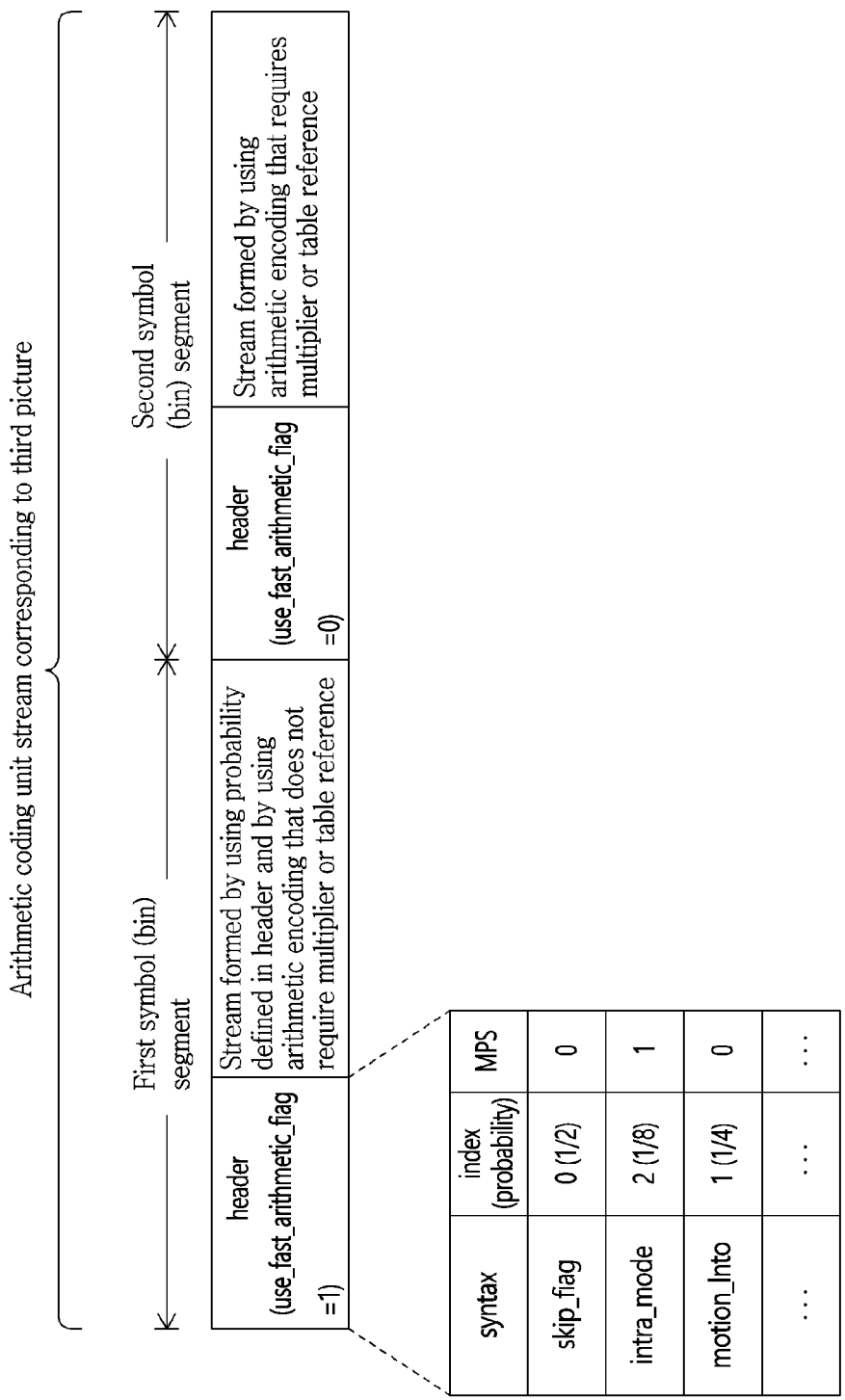

FIGS. 17 and 18 are flowcharts illustrating an operation of a decoding apparatus 20 that performs arithmetic coding according to an embodiment of the present invention. FIGS. 19 to 21 are exemplary diagrams illustrating a stream that represents a structure of a symbol segment, and a processing process and signaling for each symbol segment according to an embodiment of the present invention.

Referring to FIG. 17, when the decoding apparatus according to the embodiment of the present invention receives an image stream at step S101, the decoding apparatus 20 obtains a symbol stream entropy-encoded in association with a picture, from the image stream through the entropy decoding module 210 at step S103.

Herein, the symbol stream may include one or more symbol sequences in which multiple symbols entropy-encoded by the encoding apparatus 10 according to the embodiment of the present invention are continuously connected. Herein, the symbols may vary with each arithmetic coding method, and the symbol may be at least one selected among a binary encoded bin symbol and a predetermined character symbol.

Further, the entropy decoding module 210 obtains symbol segment information from information signaled through the image stream at step S105, and identifies a symbol segment from the encoded symbol stream at step S107.

According to the embodiment of the present invention, as shown in FIGS. 19 to 21, a symbol stream corresponding to each picture may include one or more symbol segments, and symbol segment information may include identification information of each symbol segment, position information, and decoding process identification information corresponding to the symbol segment.

The symbol segment information may be generated by the encoding apparatus 10 and may be signaled to the decoding apparatus 20. The encoding apparatus 10 selects an appropriate symbol segment structure according to entropy encoding efficiency and selects a decoding process corresponding thereto through the entropy encoding module 160 so as to perform processing for each segment, and then explicitly or implicitly signals the corresponding symbol segment information to the decoding apparatus 20.

For example, the symbol segment information may be explicitly transmitted in header information corresponding to each image processing unit, or may be implicitly transmitted according to a predetermined segmentation method.

Accordingly, the entropy decoding module 210 of the decoding apparatus 20 selects one of multiple entropy decoding processes in association with the identified symbol segment at step S109, and processes the multiple symbols included in the symbol segment collectively or concurrently according to the selected process at step S111.

For example, the symbol segment information may include process identification information for selecting any one of the multiple entropy decoding processes, and may be determined by the encoding apparatus 10 to be signaled to the decoding apparatus 20.

Accordingly, the entropy decoding module 210 of the decoding apparatus 20 may selectively determine the entropy decoding process corresponding to the identified symbol segment according to the symbol segment information. Further, the selectively determined entropy decoding process may be applied collectively in association with multiple symbols. Thus, the entropy decoding module 210 may simultaneously perform batch processing on all the multiple symbols within the symbol segment by the selected entropy decoding process.

Accordingly, the encoding apparatus 10 is capable of efficiently processing entropy encoding considering the case where multiple symbols are segmented and batch processing is performed according to the characteristic for each segment so that the throughput performance is more enhanced. Consequently, entropy decoding processing efficiency of the decoding apparatus 20 may be enhanced.

That is, compared to the case where each of the symbols is encoded due to parsing dependency between each of adjacent symbols, the encoding apparatus 10 may perform symbol segmentation and corresponding batch processing depending on whether or not the processing efficiency is more enhanced by symbol segmentation according to the embodiment of the present invention, and may signal the corresponding symbol segment information to the decoding apparatus 20.

Hereafter, with reference to FIGS. 18 and 19 to 21, a case where the decoding apparatus 20 selectively processes multiple entropy decoding processes in association with the symbol segment according to the embodiment of the present invention, will be described.

First, the decoding apparatus 20 selects an entropy decoding process to be performed on the symbol segment from the symbol segment information at step S201.

Herein, the entropy decoding process may include one or more entropy decoding processes to be collectively performed in common on the multiple symbols included in the symbol segment. More specifically, the one or more entropy decoding processes may include at least one among all bypass processing, all fixed probability processing (no probability update), and fast arithmetic probability processing.

Therefore, the corresponding symbol segment information may be determined by the encoding apparatus 10 according to the processing efficiency, and may be explicitly or implicitly signaled from the encoding apparatus 10. Particularly, when explicitly signaled, the symbol segment information corresponding to each symbol segment is transmitted in the header information within the image stream.

Correspondingly, the decoding apparatus 20 performs each process corresponding to the selected process through the entropy decoding module 210.

First, the entropy decoding module 210 determines whether or not the all bypass processing is selected at step S203. When the all bypass processing is selected, the entropy decoding module 210 performs all bypass decoding in association with the all symbols within the symbol segment at step S205.

For example, as shown in FIG. 19, an arithmetic coding unit stream, which is a predetermined unit, entropy encoded in association with a first picture is received by the decoding apparatus 20.

Further, the symbol segment information may include a flag (all_bypass_bin_flag) indicating whether or not the all bypass processing is selected, and the header information of each symbol segment may include the all bypass processing flag.

For example, in the case where when the encoder encodes an arbitrary symbol segment, it is determined that there is no difference in compression efficiency within a predetermined range even though all symbols (for example, bins) within the symbol segment are encoded into bypass bins, or that real-time encoding and decoding are difficult because the number of bins is equal to or greater than a predetermined number, the encoding apparatus 10 performs arithmetic coding that all syntax information within the arbitrary symbol segment is processed into a bypass bin. Correspondingly, the header information corresponding to the arbitrary symbol segment includes all_bypass_bin_flag which is 1.

In the meantime, in the case where all bypass processing is not required according to the efficiency of real-time encoding and decoding, the existing processing may be performed for a stream that is processed in a manner that mixes regular bins and bypass bins. The corresponding all_bypass_bin_flag may be set to 0, or may be implicitly signaled when the flag is not included.

Correspondingly, the entropy decoding module 210 identifies the all bypass processing flag and processes all bypass decoding for all the symbols within the symbol segment at step S205.

Correspondingly, when all_bypass_bin_flag is 1, the decoding apparatus 20 performs arithmetic decoding that all bins are processed into bypass bins, thereby enhancing parsing performance.

In the meantime, the entropy decoding module 210 selects all fixed probability processing from the symbol segment information at step S207. When the all fixed probability processing is selected, the entropy decoding module 210 determines a fixed probability corresponding to all the symbols within the symbol segment at step S209, and performs, without a probability update, entropy decoding processing of the symbol segment based on the fixed probability at step S211.

Referring to FIG. 20, the figure shows that one arithmetic coding unit stream is partitioned into three symbol segments and with respect to a stream within a first symbol segment and a third symbol segment, fixed probability processing is performed in arithmetic coding of each bin.

As described above, in the case where when any segment is encoded, it is determined that the compression efficiency is within a predetermined error even through all bins are encoded with the fixed probability, or that real-time encoding and decoding are difficult because the number of bins has a predetermined value or larger, the encoding apparatus 10 according to the embodiment of the present invention performs arithmetic coding with the fixed probability on the bins within the symbol segment of the corresponding unit. The corresponding header information may include a probability update exception flag (no_probablity_update_flag) which is 1.

The encoding apparatus 10 may transmit the probability update exception flag, as the symbol segment information, which is contained in the header information corresponding to a segment or a larger unit to the decoding apparatus 20.

Correspondingly, the decoding apparatus 20 may determine whether or not fixed probability processing is selected according to no_probablity_update_flag. When selected, arithmetic decoding with the fixed probability is performed on all the bins within the segment, thereby enhancing parsing performance.

In the meantime, the decoding apparatus 20 determines whether or not fast arithmetic probability processing of the symbol segment is selected at step S213. When selected, the decoding apparatus 20 obtains fast arithmetic probability information from the symbol segment information, determines an initial probability corresponding to the symbol within the segment according to the fast arithmetic probability information at step S217, and processes entropy decoding that probability update is performed within a predetermined fast arithmetic probability set from the initial probability at step S219.

For example, the encoding apparatus 10 may perform, with respect to bins within any segment according to encoding efficiency, arithmetic coding by only using probability information, such as ½, ¼, ⅛, or the like, capable of fast arithmetic without a multiplier or without referring to a table.

That is, in the case where when entropy encoding is performed on any segment, it is determined that there is no difference in compressing efficiency within a predetermined range even though all bins are encoded only using the probability which is not exact but capable of fast arithmetic, or that real-time encoding and decoding are difficult due to a large number of bins, the encoding apparatus 10 collectively performs arithmetic coding processing on bins of the corresponding segment unit by only using the probability which is capable of fast arithmetic.

Further, in order to represent the fast arithmetic probability information, the encoding apparatus 10 may transmit, to the decoding apparatus 20, the symbol segment information on which probability among the probabilities is used for each bin or for a syntax corresponding to the bin, wherein the symbol segment information is contained in the header information corresponding to a segment or a larger unit.

Herein, the symbol segment information may be contained in the header information as shown in FIG. 21, and may have a flag form of use_fast_arithmetic_flag. Corresponding to the flag use_fast_arithmetic_flag, the header information may contain index information that indicates the probabilities of bins corresponding to each syntax within the symbol segment. The index information may be determined by a preset probability table, for example, 0:0% 1:½%, 2:¼%, 3:⅛% 4:¹⁄₁₆%, and so on. Further, the header information may further contain maximal possible symbol (MPS) or least possible symbol (LPS) flag information.

Correspondingly, the decoding apparatus 20 may determine, from the transmitted header information, an initial probability capable of fast arithmetic corresponding to the symbols (bins) within each segment, and may perform entropy decoding processing that only probability update is performed within a preset probability set according to the initial probability and the index information.

For example, when in encoding the bins, probabilities of ½ and ¼ are present in a predetermined probability set index capable of fast arithmetic, the entropy decoding module 210 of the decoding apparatus 20 performs only a probability update from the probability of ½ to the probability of ¼, or vice versa, thereby enhancing parsing performance and performing fast decoding processing.

In the meantime, in the batch processing as described above, the batch processing process may be performed on one or more particular symbols included in one symbol segment. For example, the decoding apparatus 20 may identify target symbols for the all bypass processing, the fixed probability processing, or the fast arithmetic probability processing described above, from the symbol segment information, and may perform batch processing on the target symbols.

For example, the symbol segment information generated and signaled by the encoding apparatus 10 may include information on the target bin corresponding to a particular symbol (or syntax), and may further include an all process flag (all_bypass_bin or no_probablity_update or use_fast_arithmetic) corresponding to the target bin. Correspondingly, the decoding apparatus 20 may identify the target symbol (or syntax) within the symbol segment and may identify the batch processing process corresponding thereto for simultaneous processing.

The above-described methods according to the present invention may be implemented as a program to be executed in a computer and the program may be stored in a computer-readable recording medium. Examples of the computer-readable recording medium include ROMs, RAMs, CD-ROMs, magnetic tapes, floppy disks, optical data storage devices, and the like, and also include a means implemented in a form of carrier waves (for example, transmission over the Internet).

The computer-readable recording mediums may be distributed over computer systems connected over a network so that computer-readable codes are stored and executed in a distributed manner. Further, functional programs, codes, and code segments for implementing the methods can be easily inferred by programmers in the art to which the present invention belongs.

Although the exemplary embodiments of the present invention have been illustrated and described above, the present invention is not limited to the aforesaid particular embodiments, and can be variously modified by those skilled in the art without departing the gist of the present invention defined in the claims. The modifications should not be understood individually from the technical idea or perspective of the present invention.

The invention claimed is:

1. An image decoding method performed by an image decoding apparatus, the image decoding method comprising:
   selecting an arithmetic decoding process corresponding to a symbol segment; and
   decoding at least one symbol included in the symbol segment in response to the arithmetic decoding process,
   wherein the arithmetic decoding process is selected based on a number of symbols included in the symbol segment.

2. The image decoding method of claim 1, wherein when the number of symbols included in the symbol segment is greater than a predetermined number, the arithmetic decoding process is selected as bypass decoding.

3. The image decoding method of claim 2, wherein the arithmetic decoding process corresponding to the symbol segment is selected from among a plurality of arithmetic decoding processes based on the number of symbols in the symbol segment.

4. An image encoding method performed by an image encoding apparatus, the image decoding method comprising:
   processing arithmetic encoding on quantized image information to generate a bitstream,
   wherein the processing arithmetic encoding comprises:
   selecting an arithmetic encoding process corresponding to a symbol segment; and
   encoding at least one symbol included in the symbol segment in response to the arithmetic encoding process,
   wherein the arithmetic encoding process is selected based on a number of symbols included in the symbol segment.

5. The image encoding method of claim 4, wherein when the number of symbols included in the symbol segment is greater than a predetermined number, the arithmetic encoding process is selected as bypass encoding.

6. The image encoding method of claim 5, wherein the arithmetic encoding process corresponding to the symbol segment is selected from among a plurality of arithmetic encoding processes based on the number of symbols in the symbol segment.

7. A non-transitory computer-readable recording medium storing a bitstream that is generated by an image encoding method, the image encoding method comprising:
   processing arithmetic encoding on quantized image information to generate a bitstream,
   wherein the processing arithmetic encoding comprises:
   selecting an arithmetic encoding process corresponding to a symbol segment; and
   encoding at least one symbol included in the symbol segment in response to the arithmetic encoding process,
   wherein the arithmetic encoding process is selected based on a number of symbols included in the symbol segment.

8. The non-transitory computer-readable recording medium of claim 7, wherein when the number of symbols included in the symbol segment is greater than a predetermined number, the arithmetic encoding process is selected as bypass encoding.

9. The non-transitory computer-readable recording medium image encoding method of claim 8, wherein the arithmetic encoding process corresponding to the symbol segment is selected from among a plurality of arithmetic encoding processes based on the number of symbols in the symbol segment.

* * * * *